July 11, 1967    K. M. CORNELL ETAL    3,331,069
CONTACT ANALOG
Filed Oct. 23, 1963    11 Sheets-Sheet 1

*INVENTORS.*
KENT MYLES CORNELL
JEROLD HENRY GARD
BY CHARLES LEWIS McAFEE

*Brown Jackson Boettcher Dunner*

ATTYS.

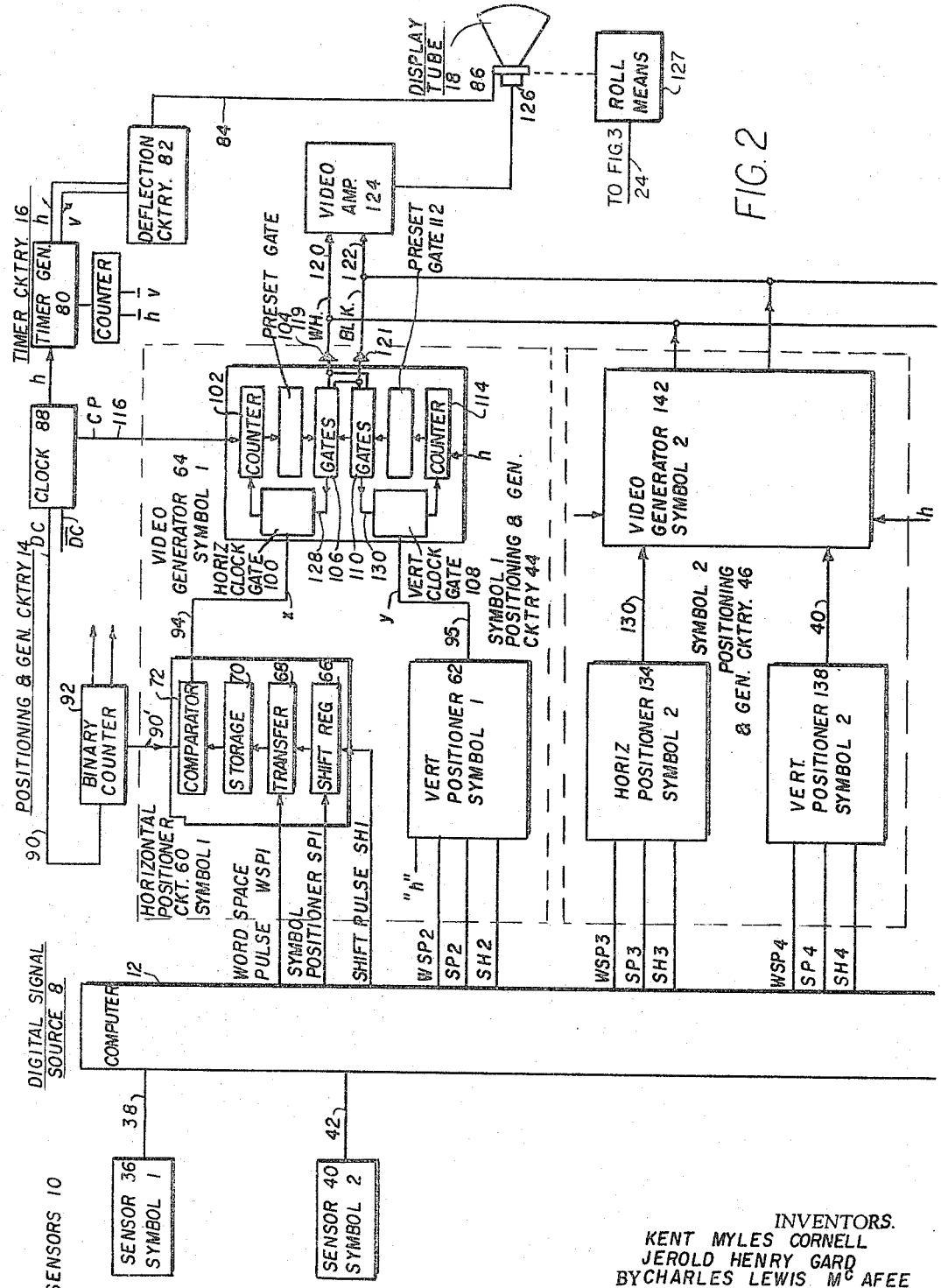

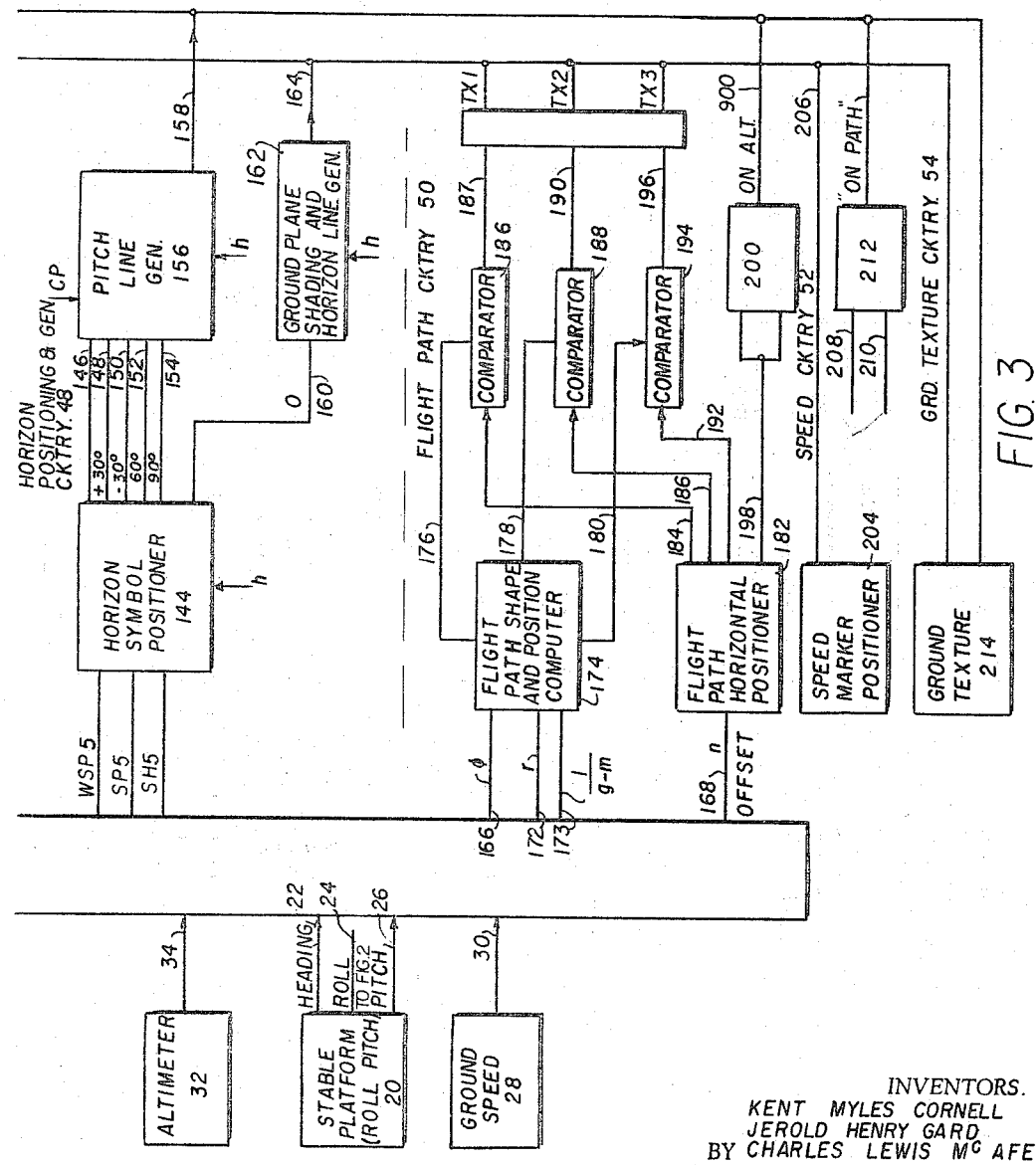

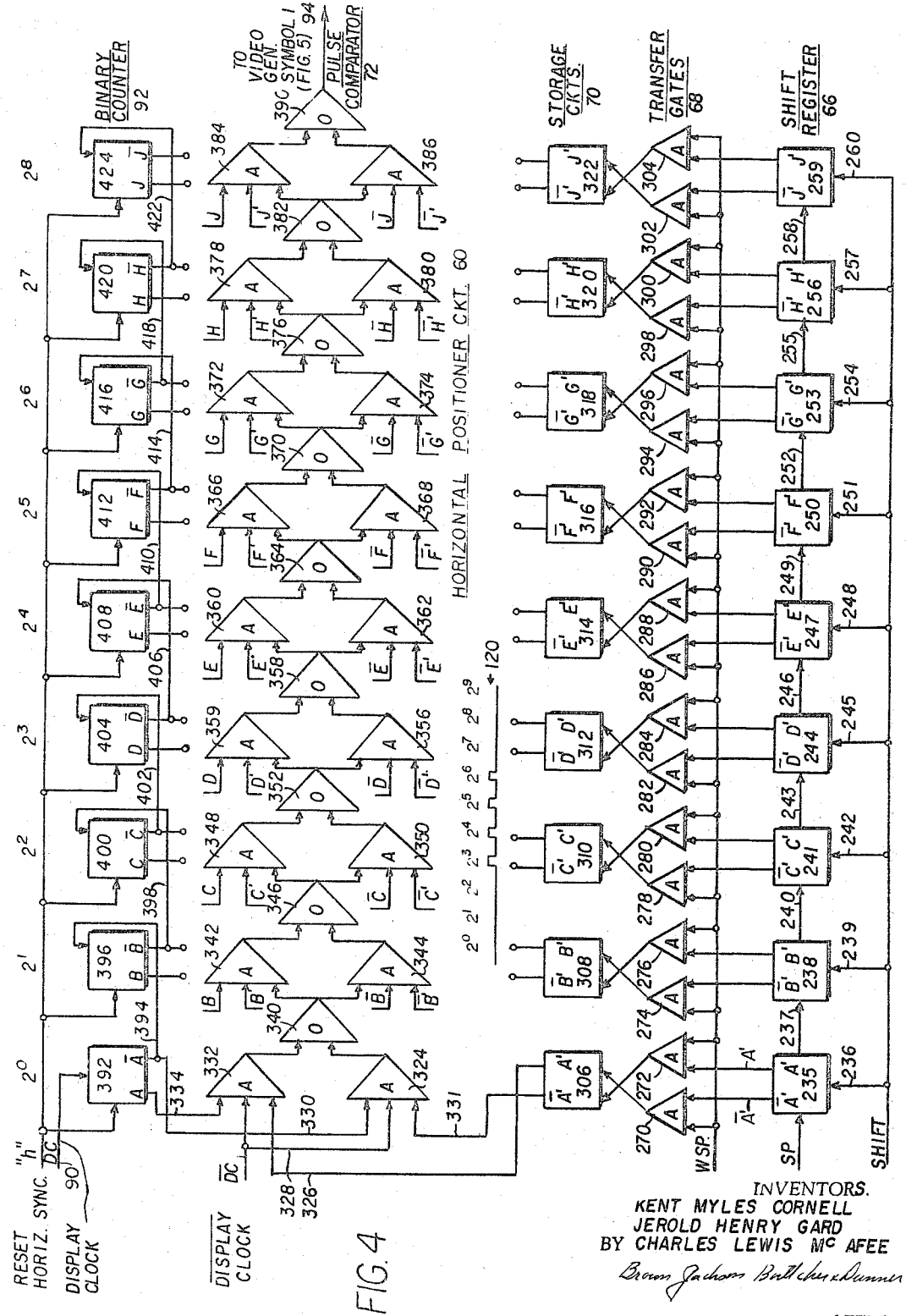

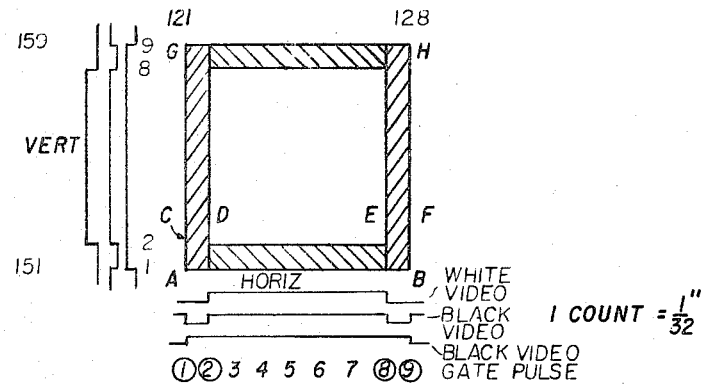
FIG. 6A
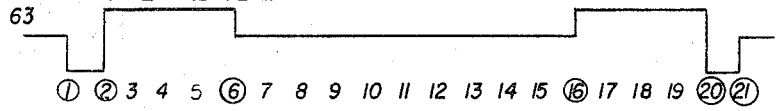
FIG. 6B
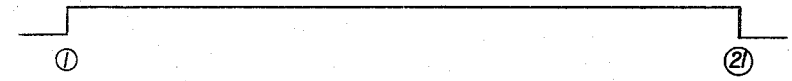
FIG. 6C
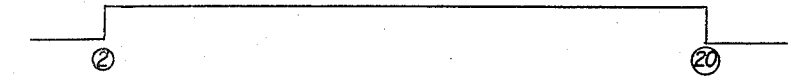
FIG. 6D
FIG. 6E
TRUTH TABLE
|    | A | B | C | D | W | X | Y | Z |
|----|---|---|---|---|---|---|---|---|
| 0  | 0 | 0 | 0 | 0 | 0 | 0 | 0 | 0 |
| 1  | 0 | 0 | 0 | 1 | 0 | 0 | 0 | 1 |
| 2  | 0 | 0 | 1 | 0 | 0 | 0 | 1 | 0 |
| 3  | 0 | 0 | 1 | 1 | 0 | 0 | 1 | 1 |
| 4  | 0 | 1 | 0 | 0 | 0 | 1 | 0 | 0 |
| 5  | 0 | 1 | 0 | 1 | 0 | 1 | 0 | 1 |
| 6  | 0 | 1 | 1 | 0 | 0 | 1 | 1 | 0 |
| 7  | 0 | 1 | 1 | 1 | 0 | 1 | 1 | 1 |
| 8  | 1 | 0 | 0 | 0 | 1 | 0 | 0 | 0 |
| 9  | 1 | 0 | 0 | 1 | 1 | 0 | 0 | 1 |
| 10 | 1 | 0 | 1 | 0 | 1 | 0 | 1 | 0 |
| 11 | 1 | 0 | 1 | 1 | 1 | 0 | 1 | 1 |
| 12 | 1 | 1 | 0 | 0 | 1 | 1 | 0 | 0 |
| 13 | 1 | 1 | 0 | 1 | 1 | 1 | 0 | 1 |
| 14 | 1 | 1 | 1 | 0 | 1 | 1 | 1 | 0 |
| 15 | 1 | 1 | 1 | 1 | 1 | 1 | 1 | 1 |
INVENTORS.
KENT MYLES CORNELL
JEROLD HENRY GARD
BY CHARLES LEWIS McAFEE
ATTYS.

July 11, 1967     K. M. CORNELL ETAL     3,331,069
CONTACT ANALOG

Filed Oct. 23, 1963     11 Sheets-Sheet 7

INVENTORS.
KENT MYLES CORNELL
JEROLD HENRY GARD
BY CHARLES LEWIS McAFEE

ATTYS.

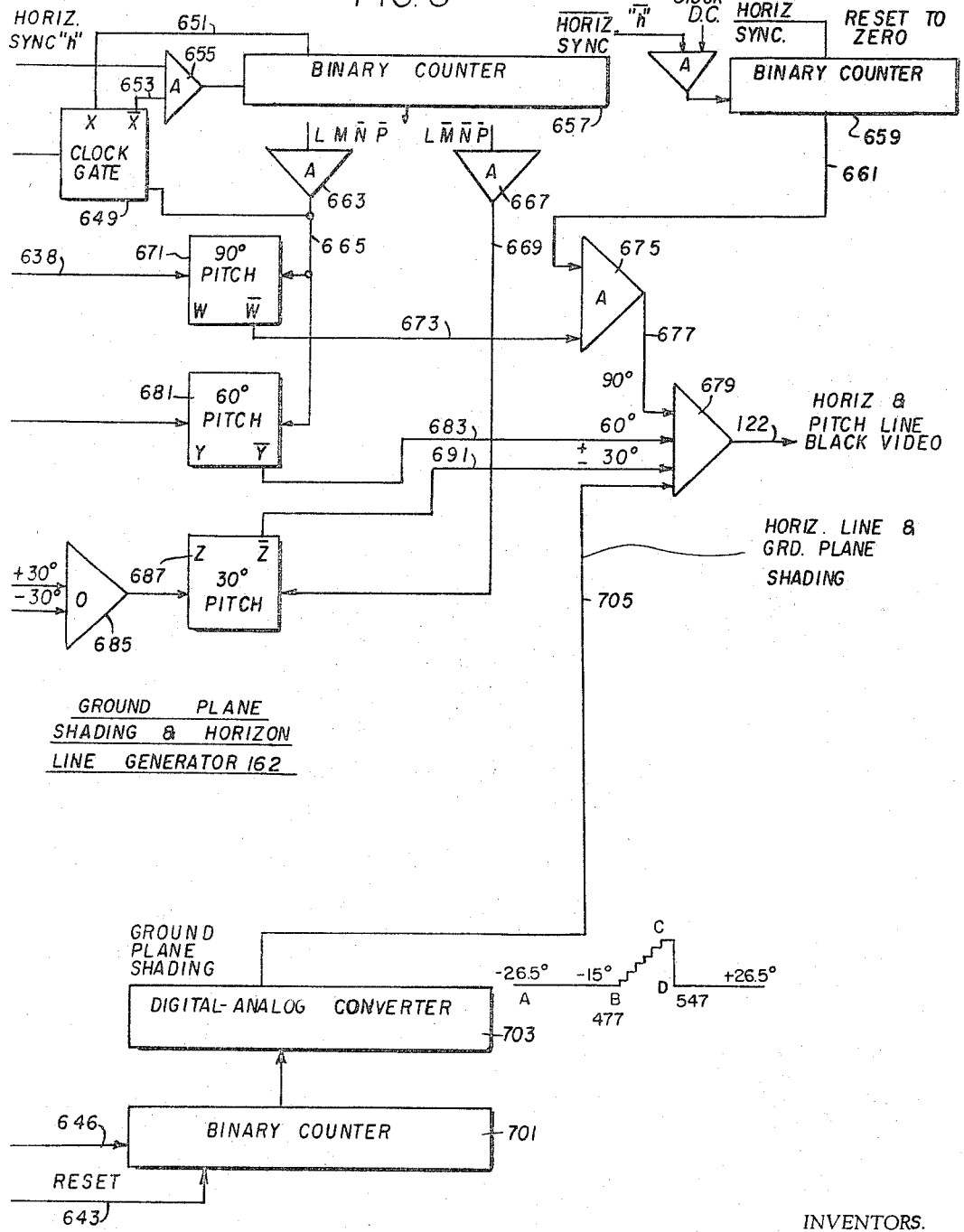

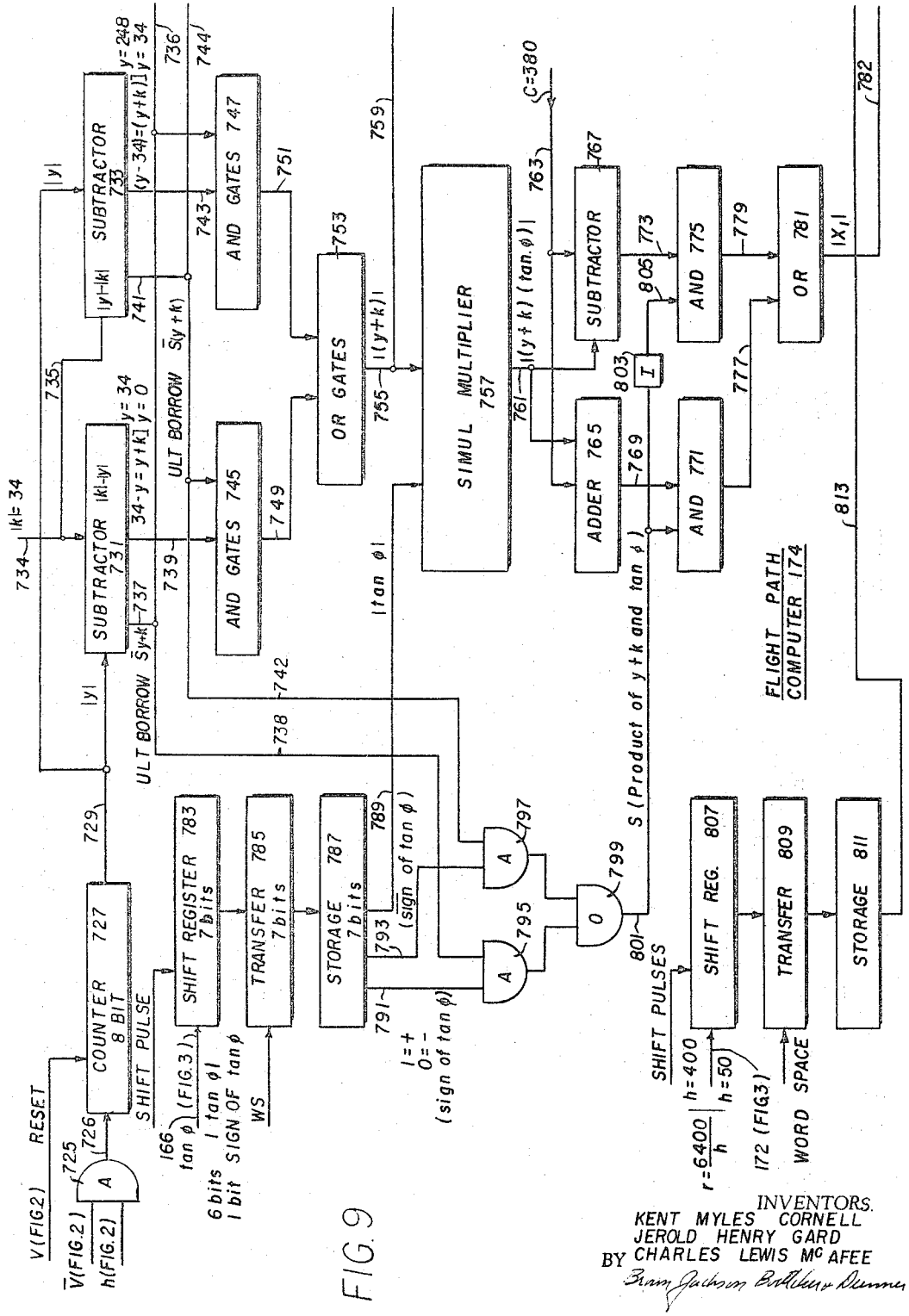

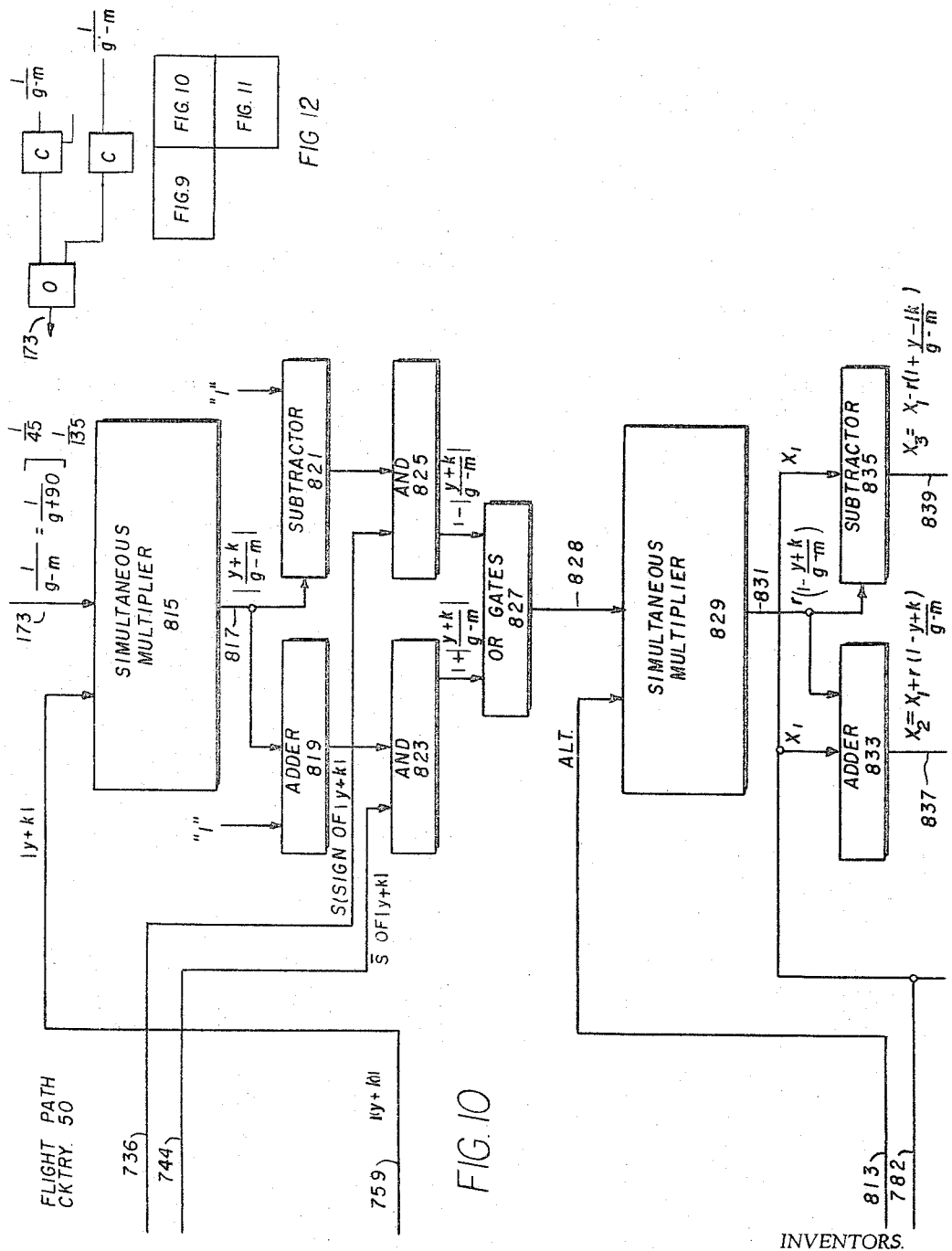

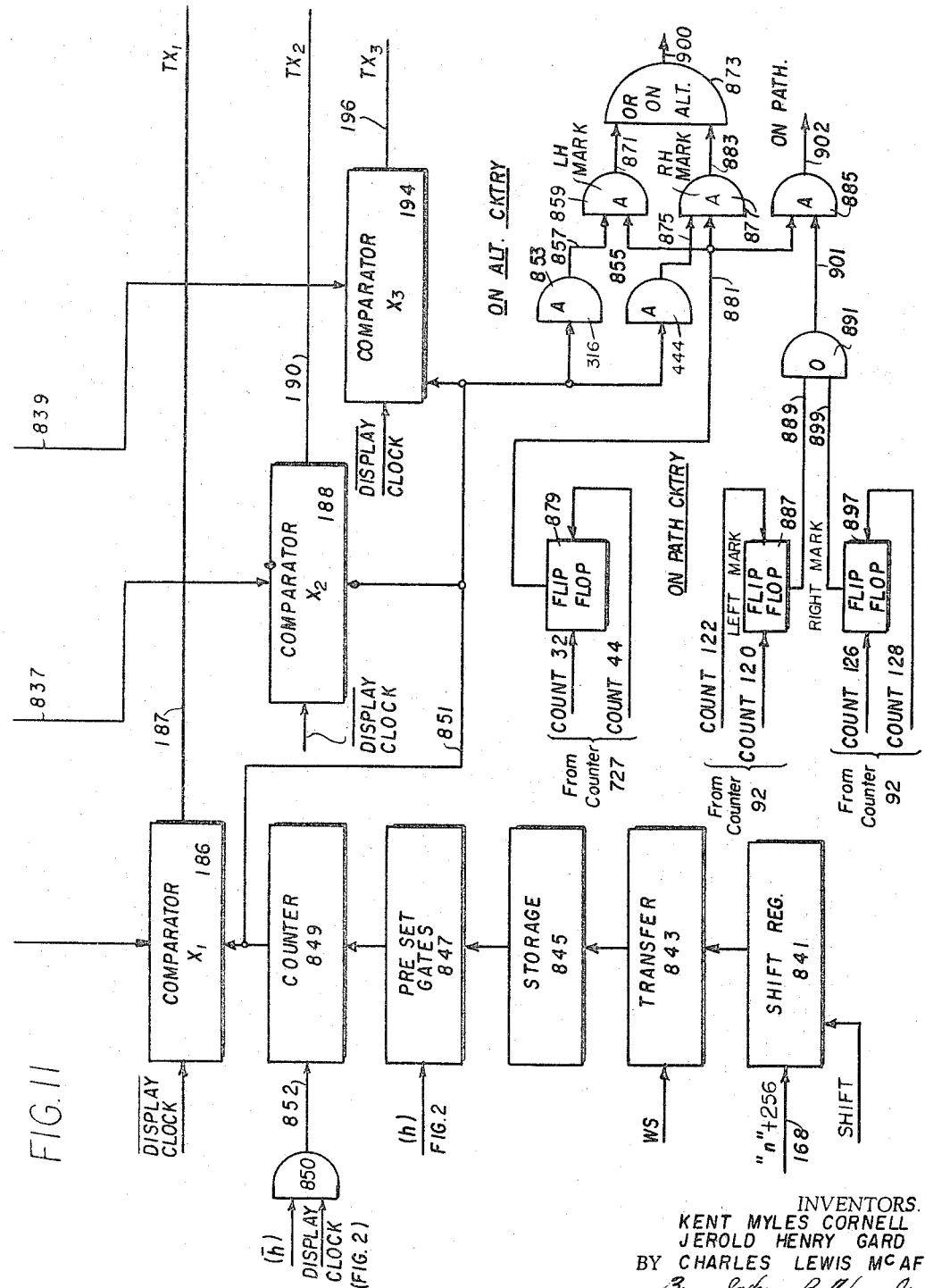

3,331,069
CONTACT ANALOG
Kent Myles Cornell, San Jose, Jerold Henry Gard, Los Altos, and Charles Lewis McAfee, San Jose, Calif., assignors, by mesne assignments, to Kaiser Aerospace & Electronics Corporation, Oakland, Calif., a corporation of Nevada
Filed Oct. 23, 1963, Ser. No. 318,208
55 Claims. (Cl. 343—11)

The present invention relates to the provision of a display of cue information on a display device relating to the flight condition of an aircraft, and particularly to an all-electronic signal generator system of such type which accepts a digital input.

In recent years various types of instrumentation have been developed for the specific purpose of integrating information relating to the flight condition of the aircraft into a single display, so that the pilot may quickly ascertain the condition of the aircraft by a momentary glance at the display. A particular advantage of such type arrangement is the substantial reduction achieved in pilot response time, and the corresponding increase in the degree of pilot control of the aircraft. One successful embodiment of such type equipment has been set forth in the application to George H. Balding, Ser. No. 728,019, which was filed on Apr. 11, 1958, now Patent No. 3,093,-822, issued June 11, 1963, and assigned to the assignee of the present invention.

In such type arrangement which has proven particularly successful in the field, the electronic equipment generates basic cues related to information in the real world including a sky texture, a ground texture, and a horizon which separates the sky texture and ground texture from each other. The horizon in straight and level flight extends laterally across the approximate center of the display. With movement of the aircraft about its rotational axis, as for example in the banking of the aircraft in the execution of a turn, the horizon is displaced angularly on the display in a related manner. With changes in the pitch of the aircraft, the horizon is moved upwardly or downwardly in a related manner, the size of the ground texture and sky texture display varying with such changes in the position of the horizon line.

The ground texture in some embodiments may include symbols which move downward from the horizon and across the display at a rate related to the speed of the aircraft. The sky texture may include moving clouds as a further guide. Other symbology, such as impact points, speed markers and the like may be displayed in superposed relation with the sky or ground texture to provide additional cues to the pilot in flight.

An outstanding aid in the control of the aircraft provided in such type display comprises a flight path which provides an indication of the line of flight to be followed by the aircraft. In one embodiment, the flight path appears as a highway in the sky, comprising a white ribbon extending from the lower marginal edge of the display in the direction of the horizon, the ribbon path narrowing in width as it progresses upwardly on the display in the manner of a perspective showing. The flight path circuitry is operative with the recept of sensed or programmed data to adjust the path to various shapes and positions to thereby provide command information including command heading, command pitch up, command pitch down, turn information, heading error and "on-path" and "on-altitude" conditions of the aircraft. As will be shown in more detail hereinafter, additional display symbols, such as symbols to indicate relative speed, programmed speed and the like, which may be used in conjunction with the foregoing basic cues are also provided by the novel circuitry to assist the pilot in his guidance of the craft.

It will be apparent that the provision of such type display requires the provision of signals (which may be generated, simulated, programmed, sensed, etc.) which continually indicate the condition of the aircraft and such other information as is to be displayed. The basic information required in most aircraft installations includes data concerning the pitch attitude of the aircraft, the heading, the altitude, the roll attitude and the heading error. In the field, it has been found that in certain installations such information is available in analog form, while in other installations, the information may be received in the digital or bit serial form. In the embodiment described in the application, the information was basically received in analog form. It is a primary object of the present invention to provide a new and novel circuit arrangement which is operative to provide an integrated display of such information as received in the digital or bit serial form.

A feature of the invention is the manner in which the display is provided on a raster producing display device, and associated means continually provide an indication of the coordinate position of the raster trace in terms of X, Y coordinates. Associated means identify the position of the information to be displayed in terms of X, Y coordinates, and symbol positioner means are operative when coincidence occurs between the coordinates of the trace and the coordinates which identify the position to energize a video generator circuit in the display of the corresponding cue on the display device at the desired position on the display.

It is a further object of the invention to provide such type circuitry which utilizes micrologic components, whereby the reliability of the device is substantially increased over other known forms of electronic components, and particularly, in which the useable "life without repair" of the equipment is substantially increased.

It is yet another object of the invention to provide such type of device for use in providing a display of useful information relating to moving objects such as aircraft, and the like, and specifically to provide such type arrangement which is responsive to digital signals to provide a display which includes a horizon or reference line which is adjustable to different positions to indicate variation in elevation angle (pitch) and roll.

It is a further object of the invention to provide apparatus of such type which includes means for effecting the provision of ground texture with said horizon line, as well as a plurality of pitch lines, each of which has different characteristics for identifying a different predetermined elevation angle.

It is yet another object of the invention to provide apparatus of the type which includes source means for providing signals representative of a range of line positions for display on the target which is greater than the total number of line positions which may be displayed on the target, and which includes means for selectively effecting operation of only the ones of the video generator means which have a preassigned line position which lies within the range of lines selected by the source means.

It is a further object of the invention to provide a raster type display means in said apparatus and counter means which count the line traces of the raster, and means for presetting said counter means to start at different values for different elevation angles of the object to thereby select a different range of lines for display on the display means.

It is a further object of the invention to provide such apparatus including source means operative to generate digital signals representative of the X, Y coordinates of a path on the target of the display means, and video generator means operative responsive to said signals to effect a display of the path at said coordinates on associated display means.

It is yet another object of the invention to provide novel source means which include means for providing a display of the path on the target, and a second means for providing markers with said path to indicate deviation of the object from an assigned altitude.

It is an additional object of the invention to provide means for effecting lateral displacement of the path on the target with variation of the object from a course, and means for simultaneously effecting corresponding lateral displacement of the altitude markers for the path.

It is an additional object of the invention to provide a first means for providing a path on the display which includes a center line, and a second means for providing at least one marker on said target which locates the position of the path center line whenever the object is in the correct lateral position.

It is yet another object of the invention to provide a display device of such type which includes means for adjusting the X, Y coordinates for the path to different values for different heading error signals to thereby effect displacement of the path apex to represent heading error.

It is yet an additional object of the invention to provide a display device having a target defined by Cartesian coordinates, and means for providing signals definitive of a path on the display in accordance with the formula $X_1 = (y) \tan \phi$ in which $y$=the line of trace on the raster and $\tan \phi$=heading error angle of the object.

It is yet a further object of the invention to provide a display device of such type in which the path on the display is displayed in accordance with the formulas $$X_1 = (y+k) \tan \phi + n + c$$

$$x_2 = [(y+k) \tan \phi + n + c] + r\left(1 - \frac{y+k}{g-m}\right)$$

$$x_3 = [(y+k) \tan \phi + n + c] - r\left(1 - \frac{y+k}{g-m}\right)$$

the definitions of which are more fully set forth hereinafter.

It is an additional object of the invention to provide source means which include a computer controlled to compute the X, Y coordinates of a path for a given set of conditions, means for effecting generation of the path for effecting display of the path at the coordinates computed, and sensor means for providing variable inputs to compute the values of the X, Y coordinates, and thereby the nature of the path position and outline.

The foregoing objects and features of the invention and others which are believed to be new and novel in the art are set forth in the following specifications, claims and drawings in which:

FIGURES 2 and 3 are block diagrams of the component parts of the novel visual cue generator system including the manner of connection of the system to associated computer and data providing devices;

FIGURE 4 is a detailed schematic diagram of a symbol positioner for positioning a predetermined symbol on the display device;

Figure 1A:
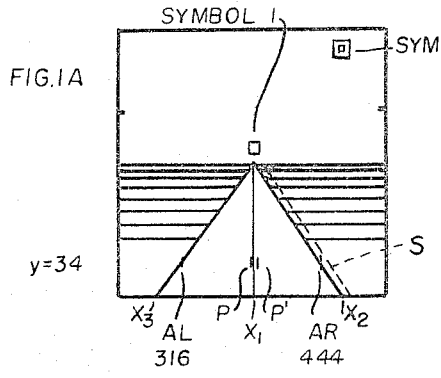
FIGURES 1A–1G are pictorial representations of various forms of information displayed on the display device responsive to the receipt of different sets of bit serial information from associated input means.
Figure 1B:
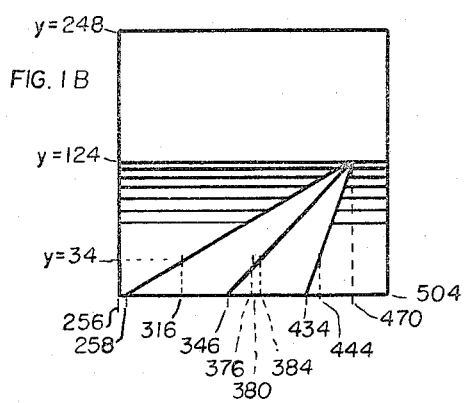
Figure 1C:
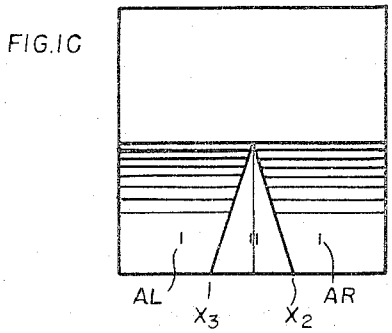
Figure 1D:
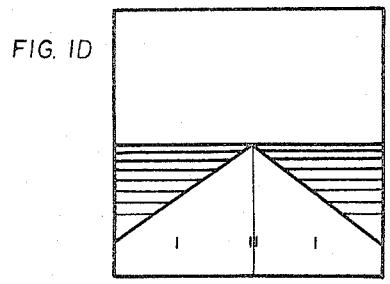
Figure 1E:
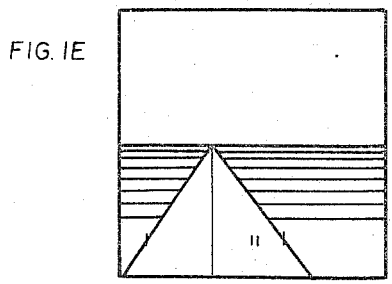
Figure 5:
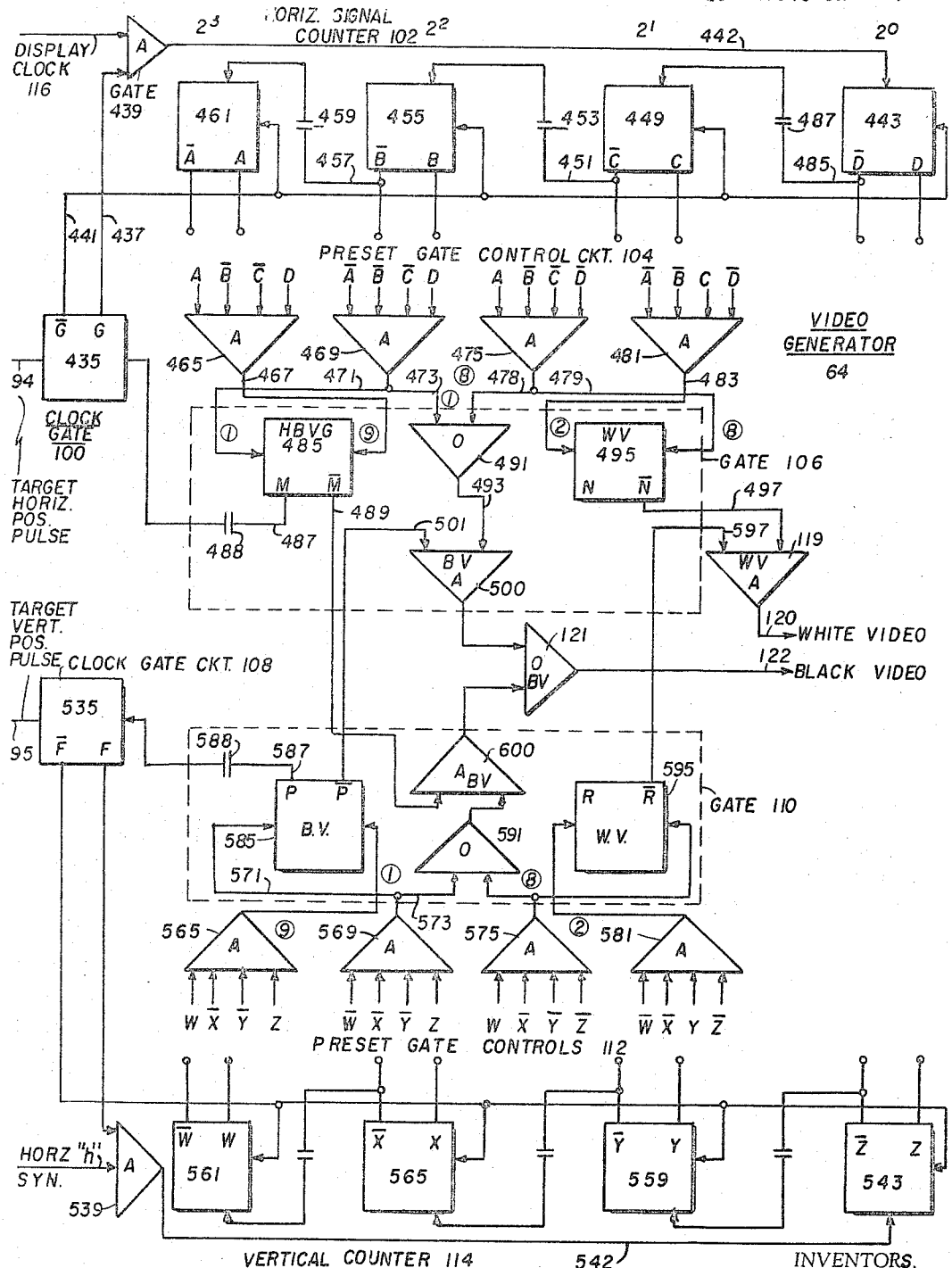
FIGURE 5 is a schematic showing of the video generator for effecting generation of signals for displaying the predetermined symbol as controlled by the symbol positioner of FIGURE 4.
Figure 7:
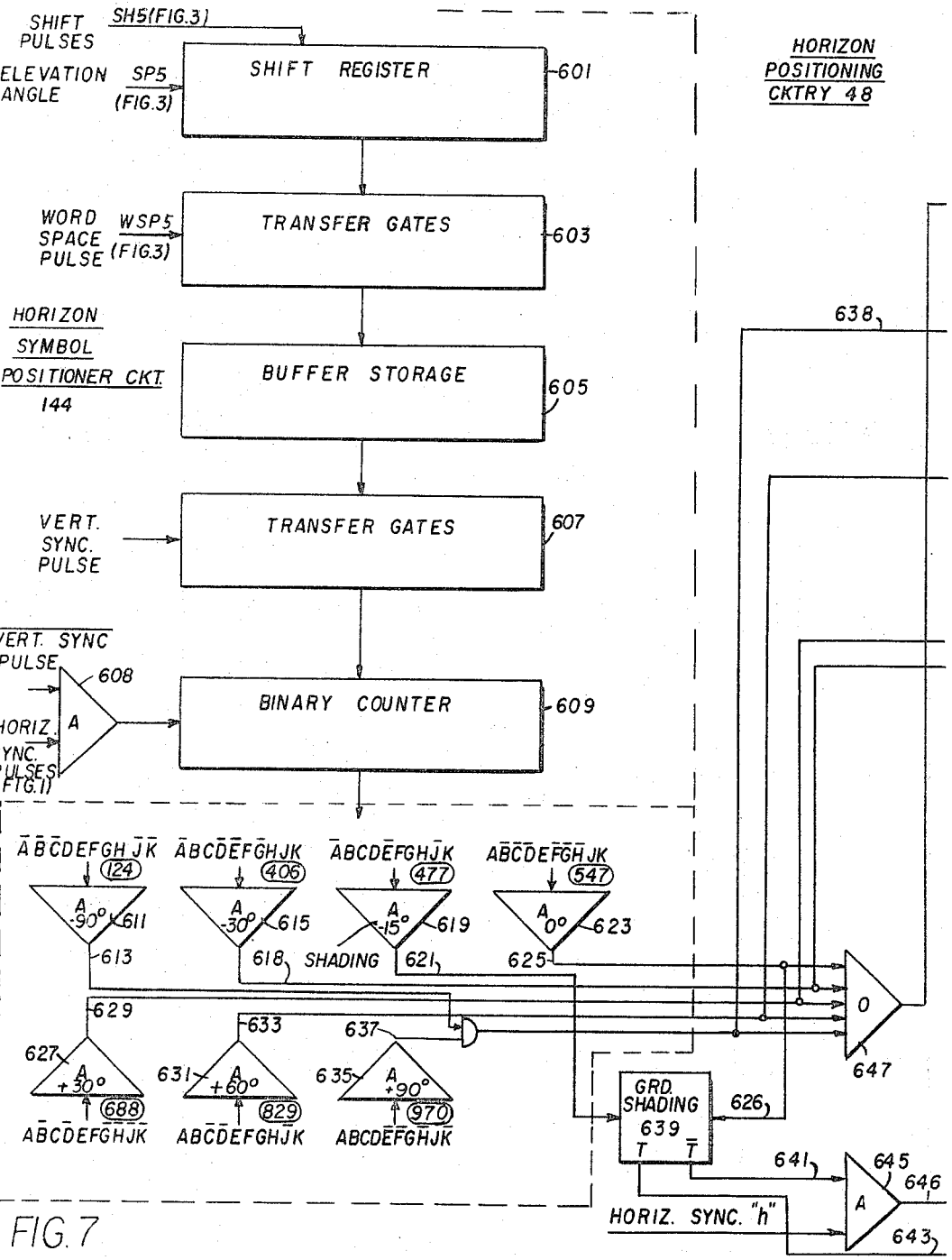

FIGURE 6A discloses a representative set of waveforms which are generated in the display of the symbol 1 shown in FIGURE 1A of the drawings;

FIGURES 6B–6D disclose a representative set of waveforms which are generated in the display of symbol 2 shown in FIGURE 1A of the drawings;

FIGURE 6E is a truth table for the signals used in the operation of the video generator of FIGURE 5;

FIGURES 7 and 8 are detailed schematic diagrams of the circuit generating equipment for providing the horizon and pitch lines shown in FIGURE 1E;

FIGURES 9, 10 and 11 are detailed circuit diagrams of the generator and positioner circuitry for effecting display of a flight path on the display device in the manner shown in FIGURES 1A–1H; and FIGURE 12 is a block showing of the manner of arranging FIGURES 9, 10 and 11 with each other.

GENERAL DESCRIPTION

Initial reference is made to the pictorial representations of FIGURES 1A–1G which set forth representative showings of the displays which may be provided by the novel generating circuit of the disclosure. As indicated heretofore, a display generator for use in mobile equipment, such as aircraft, preferably provides an integrated display of cues indicating the condition of the aircraft relative to its major axes, and such cues normally include horizon, pitch, roll, azimuth and altitude. The present device additionally provides a flight path to indicate the desired path of the aircraft including an indication of heading error (deviation to the left or right of the desired path), above altitude and below altitude error, pitch lines, steer left or right, command pull up, command pitch down, and others. The circuitry also discloses circuit means for generating a first and a second symbol which may be readily adjusted to various positions on the display. The manner in which other types, forms and shapes of symbols may be generated and positioned on the display will be readily apparent therefrom.

With reference to FIGURES 1A–1G, the pictorial representations set forth thereat disclose the manner in which the different cues are changed in size, shape and position to represent changes in the aircraft flight condition.

With reference first to FIGURE 1A, the display there shown is provided whenever the aircraft is "on-course" and in level flight. Such display includes a sky portion of a comparatively light intensity, a sharp black horizon line, and a ground portion of varied intensity, the portion of the display adjacent the horizon being of a darker intensity, and successive increments in the direction of the bottom of the display being of a successively lighter intensity. With such condition of flight, the path extends from the bottom of the display toward the horizon, the path being wider at the bottom and narrowing in the direction of the horizon to provide a perspective character to the path. The edges of the path $X_2$, $X_3$ when the aircraft is at the assigned altitude (assumed as 100 feet above the desired path in the present disclosure), pass through "on-altitude" reference marks AR and AL located at the lower marginal edge of the display. If the aircraft is "on-path" the path center line passes through a pair of vertical "on-path" reference marks P, P' as shown in FIGURE 1A. A dotted speed marker line S is presented along the right marginal edge of the path, and when the programmed speed is maintained the marks will be motionless. If the aircraft is moving too fast, the marks move in the direction of the lower marginal edge of the display, and if the aircraft is moving too slow the marks move in the direction of the horizon. Symbol 1 located in the sky portion of the display indicates the ultimate target or destination of the aircraft in the present disclosure. Symbol 2 may be used to indicate the presence of other aircraft, if desired.

Assuming that the programmed information indicates a turn is to be executed to the right, the display will be altered to that shown in FIGURE 1B. As there shown, the aircraft is at the proper altitude and proper lateral position, and a turn to the right is required.

Manifestly, maneuvering of the aircraft to the right will bring the aircraft back on course, and the display will again be that shown in FIGURE 1A.

In the event that the aircraft gains altitude (FIGURE 1C), the path will narrow, and the marginal edges $X_2$, $X_3$ of the path will no longer pass through the altitude reference marks AL, AR. In the event the aircraft loses altitude, the path will widen and the marginal edges will be displaced outwardly of the reference marks AL, AR (FIGURE 1D). The display of FIGURE 1C indicates the aircraft is approximately four-hundred feet above the desired path, and the showing of FIGURE 1D indicates the aircraft is approximately fifty feet below the path (i.e., too low).

In the event the aircraft is off the path laterally, the path will be laterally displaced and the center line of the path will move out of registration with the "on-path" markers P and P'. The display in FIGURE 1E, for example, illustrates the condition in which an aircraft is at the correct altitude and in level flight but to the right of the desired path (command left turn).

Figure 1F:
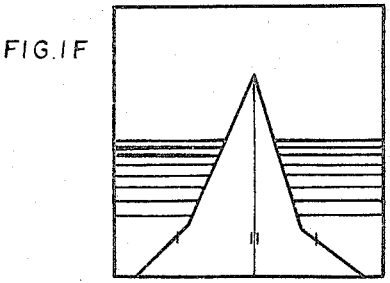
Figure 1G:
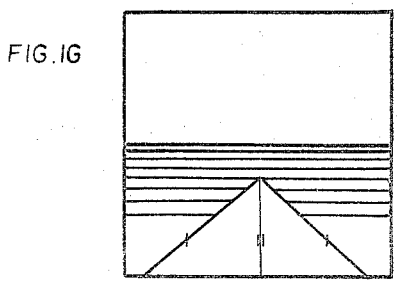

The flight path is also utilized in the provision of command "pitch-down" and command "pitch-up" instructions to the pilot. As shown in FIGURE 1F, a pitch-up command is illustrated by moving the apex of the flight path upwardly from the horizon to indicate to the pilot that the aircraft should be maneuvered into a climb position to reach a higher altitude. As the desired altitude is reached, the path will move downwardly to bring the apex of the flight path into registration with the horizon line. The display of a command pitch-down is illustrated in FIGURE 1G.

In the event that the aircraft changes pitch, the horizon line is displaced vertically. Thus, as the aircraft is maneuvered into a climb of relatively mild attitude, the horizon is moved downwardly from its center position on the display in the direction of the lower marginal edge, and as the climb attitude of the aircraft increases a thirty-degree inclination mark appears at the top of the display. If the climb attitude of the aircraft is increased sufficiently, the horizon line will move off the bottom of the display, and the thirty-degree line will be moved downwardly on the display. As set forth more fully hereinafter, guide lines and pitch lines are provided at the thirty-degree (plus and minus), sixty-degree and ninety-degree angles. Further, the horizon line is rotated whenever the aircraft is banked in the execution of a turn, the angle of rotation being representative of and consistent with the degree of bank of the aircraft.

As indicated above, symbols 1 and 2 may be generated to illustrate a touch down point, ultimate destination, terrain clearance guide, or any of a number of other flight assists. As shown in FIGURE 1 the symbol indicates the ultimate touchdown point of the aircraft and symbol 2 indicates the presence of another aircraft.

The set of representative cues and symbols for a moving aircraft disclosed herein also finds utility in other forms of displays, and particularly in displays for other forms of mobile units, such as submarines, tanks, ships, and the like, and the invention is not to be limited to the specific applications, and the specific forms of the cues generated by the circuitry disclosed herein.

BASIC CIRCUITRY FOR CUE GENERATION

The novel circuitry for providing the basic display cues shown in FIGURES 1A–1G is shown in block form in FIGURES 2 and 3. As there shown, the circuitry basically comprises a digital signal source 8 which in the present embodiment comprises a computer 12, a set of sensor devices 10 connected to produce input signals to the computer 12, position and generating circuitry 14 controlled by the digital output signals of the computer 12, timer circuitry 16 for synchronizing the operation of the position and generating circuitry 14, and a display tube means 18 for displaying the video signal output of the positioning and generating circuitry 14.

The display means 18 may comprise various types of commercial display devices, the display means disclosed herein comprising a conventional cathode ray tube, which includes an electron beam which may be controlled to trace a raster on the tube target at conventional TV rates, such control being provided by a conventional position selection means including timer circuitry 16 (15,750 lines per second at a field rate of 60 cycles per second to provide 525 horizontal lines per frame or 262½ pairs of lines including approximately 14 lines of blanking).

Timer circuitry 16 also controls the associated circuitry in the provision of signals to the positioner circuitry 14 which indicate the position of the beam in its trace at any time in terms of the time being traced.

As shown in more detail, each horizontal line of the trace is divided into 248 segments, whereby the line being traced determines the Y coordinate and the position of the trace on the line determines the X coordinate. The digital source 8 provides digital signals to the positioner and generating circuitry 14 which identify the positions of the symbols to be displayed in the X, Y coordinates, and with the occurrence of coincidence between the positioning signals received from the digital source 8 and the trace position of the beam as indicated to the positioner circuitry 14 by associated indicator means, the positioner circuitry 14 "unlocks" an associated video generator 64 to effect the generation of the signals which effect the display of the desired symbol at the desired position on the screen.

Reference is now made to FIGURE 2 and the block diagrams of such circuit. As there shown the digital source 8 in the present disclosure includes a set of sensors 10 having their outputs connected to a computer 12 which provides digital signals representative of the information received from the sensor devices. Although the disclosure illustrates actual sensor equipment used in aircraft in the field, it will be apparent to parties skilled in the art that the sensors 10 and computer 12 could be replaced by a shaft encoder, a storage drum, a storage tape, simulator devices, or any other suitable mechanism capable of providing a digital signal which is representative of the information to be displayed.

The sensors 10 shown herein include a stable platform 20 (FIGURE 3) of a known commercial type which is capable of continually providing signals represented by heading, roll and pitch of the aircraft. The output signals are coupled over heading conductor 22, and pitch conductor 26 to computer 12. The roll signals output from the stable platform 20 are transmitted over conductor 24 to the roll means 127 (FIGURE 2) for the purpose of rotating the display tube 18 in a manner to be more fully disclosed hereinafter. Altimeter 32 continually couples signals indicative of the aircraft altitude over conductor 34 to computer 12, and ground speed indicator 28 continually provides signals over conductor 30 to computer 12 which represent the aircraft ground speed. Sensors 36 and 40 may comprise any of a number of known sensor devices for providing information of assistance to the pilot in controlling the aircraft. Assuming that symbol 1 (FIGURE 1A) is to be used to represent the ultimate destination of the aircraft, the sensor signals may comprise an omni unit which derives signals from a radio beacon system as to the relative position of the aircraft and the course of aircraft to reach such beacon. Sensor 40 may be coupled to a radar which detects objects, such as terrain or other aircraft, which might be in the path of the aircraft on its heading, and such information would be coupled to the computer over conductor 42. Since the present invention is directed to novel means for displaying cues responsive to the receipt of digital signals, the specific nature of the sensors is not set forth herein. Further, the sensors identified are only set forth for purposes of example, it being apparent that parties skilled in the art will find other uses for cues displayed herein with these and other sensors.

As indicated above, the output signals of the sensors 10 may be conventional analog signals (signals which vary in voltage with changes of condition) and the computer 12 is operative in response thereto to provide a digital number comprised of a plurality of serial bits which represent the X, Y coordinates on the display for the information provided by the sensor. Alternatively, the sensor may, itself, be capable of providing digital signals, and in such event the outputs of the sensors would be coupled directly to the input of positioner circuitry 14. It is, of course, apparent that in a simulator training device the sensor input may comprise potentiometers adjustable to provide various potential outputs to simulate sets of data or information to the computer for conversion to digital values for display on the display tube 18.

As indicated above, the positioning and generating circuitry 14 is comprised of a pair of positioning circuits, such as 60, 62 (FIGURE 1) and a generator, such as 64, for each of the different symbols or sets of data to be displayed on the display tube 18. The output of computer 12 in the present embodiment is coupled to each of the positioning circuitry sets in bit serial form, the X, Y information for each symbol being extended to the positioning circuitry over a discrete set of input conductors. Other methods of digital data transmission would serve to communicate the desired data, if desired, as will be apparent to parties skilled in the art.

With reference to the symbol positioning circuitry 44 (FIGURE 2) for symbol 1, representative connecting conductors include a set of three conductors WSP, SP and SH for extending the horizontal coordinate information to horizontal positioner circuit 60 for symbol 1, and a similar set of conductors WSP, SP and SH for extending the vertical coordinate information to vertical positioner circuit 62, for symbol 1.

As shown in FIGURES 2 and 3, the present embodiment discloses symbol positioning and generating circuits which include symbol 1 positioning and generating circuit 44, symbol 2 positioning and generating circuitry 46, horizon positioning and generating circuitry 48, flight path circuitry 50, speed circuitry 52, and ground texture circuitry 54. The manner in which the computer 12 is connected to these additional symbol positioning circuits will be apparent from the foregoing disclosure, and reference is made to the connections which extend therebetween.

In that the symbol positioning circuitry 44 is representative of the various symbol positioning circuitry groups, such circuitry is shown in more detail in FIGURES 2, 4 and 5, and a more detailed explanation thereof is included herewith. With reference first to FIGURE 2, symbol 1 positioning and generating circuitry 44 basically comprises a horizontal positioner circuitry 60 and a vertical positioner circuitry 62, the outputs of which are connected to a video generator 64 for the symbol 1.

Each of the symbol positioner circuits 60 and 62 basically comprise a shift register 66, a set of transfer gates 68, a storage device 70 and comparator 72. As will be shown in more detail hereinafter, the input of each positioner circuit, such as horizontal positioner circuitry 60, is coupled over an individual set of output conductors WSP1, SP1, SH1 to computer 12 which is operative to provide bit serial information (nine bits in the present example) over symbol positioner lead, such as SP1, to indicate the desired horizontal positioner of its associated cue (symbol 1 for positioner 60) on the display. Shift register 66 stores such information as received in serial form, and at such time as an appropriate time signal is received over word space pulse lead WSP1 from the computer 12 indicating that the complete set of bit information representative of the desired horizontal coordinates of symbol 1 has been recorded in shaft register 66, the transfer gates 68 effect the transfer of such information, as a number, to storage device 70.

As noted above, the received bit serial information is comprised of nine bits. The shift register 66, in turn, provides a nine bit digital number output along with its nine bit complement over eighteen different output conductors to the storage unit 70, the two words thus provided being arranged in a parallel output pattern. The number defined in the shift register 66 is updated at the speed of the computer 12. Since the number is not defined until all nine bits of a word have been stored in the shift register 66, the buffer or transfer stage 68 is operated by the word space signal received over conductor WSP1 from the computer 12 to transfer the information to the storage device 70 only after the entire word is stored in the register 66.

At the termination of the word space signal, and after transfer of the stored word, the transfer gates 68 are disabled, and no further change of state occurs in the second storage circuit stage until the next word space signal is received.

The information on the storage device 70 is continually made available to a comparator 72, and in effect indicates to such comparator the horizontal position (or X coordinate) at which the trace of the symbol is to be initiated.

As noted heretofore, the display means 18 in the present embodiment comprises a raster trace producing means, the raster being traced in the present disclosure from the bottom marginal edge toward the top marginal edge. The comparator 72 has a second input circuit 90' over which it receives an indication from indicator means including counter 92 of the actual position (X, Y coordinates) of the beam in the raster trace at any given time. As will be shown, the comparator 72 provides a coincidence signal to the generator for symbol 1 whenever coincidence occurs between the coordinates represented by the digital signal stored in the storage device 70 and the coordinates indicating the position of the raster trace.

The X, Y coordinates of the trace as received over conductor 90' are provided by a timer circuit 16 which includes a timing generator 80 operative to provide horizontal synchronizing (sync) pulses at the rate of 15,750 cycles per second, and vertical synchronizing (sync) pulses at 60 cycles per second, the timing generator 80 being of the type commonly used with commercial television transmitter equipment. A master clock unit 88 comprises a five megacycle oscillator which is operative to divide each horizontal line trace into 248 separate segments $$\left(\frac{248}{50\mu s.}\right) = \text{approximately 5 mc.}$$

by coupling its 5 mc. output signals to the timer generator 80.

The horizontal sync output signals are provided to each conductor in FIGURES 2–11 labeled with the letter "$h$," and the vertical sync pulses are coupled to each conductor labeled with the small letter "$v$" in the different figures.

As shown in FIGURE 2, the timer circuitry (or position selection means) further include conventional deflection circuitry 82 for the yoke 86 of cathode ray tube 18. The horizontal and vertical sync pulses are transmitted to the deflection circuitry 82 which is operative in a known manner to provide deflection signals over conductor 84 to the deflection means 86 on the display tube 18 to control deflection of the electron beam in the display tube 18 in the provision of a raster trace in accordance with well known raster producing techniques. Obviously, the equipment may also be used in the manner of an oscilloscope to select specific positions on the target, if desired. The present disclosure, however, is directed to a raster scan embodiment.

The signal output "DC" and "$\overline{DC}$" of the clock 88 is extended over conductor 90 to a binary counter 92, which may be common to a number of positioners in the system, and which is operative to continually count the number of segment pulses in each horizontal line as provided by the clock 88, whereby the position of the raster in the trace of a horizontal line is continually indicated by the digital output of the binary counter 92. As shown hereinafter, with the advancement of the binary counter 92 to the particular count stored in the storage circuit 70 for the horizontal positioner 60 (which indicates the initial or start horizontal coordinate of the symbol), the comparator 72 provides a start or coincidence pulse over conductor 94 to initiate generation of the symbol by the video generator 64 associated therewith.

Vertical positioner 62 for "symbol 1" is operative in a similar manner to provide a coincident pulse over conductor 95 to the video generator 64 with the coincidence of the vertical count of the trace and the vertical coordinate of the word for "symbol 1." That is, the vertical positioner 62 includes indication means comprising a binary counter (not shown) such as 92, which is operative to continuously count the horizontal line traces as the raster progresses, the count required during a raster being 248 since 14 line pairs occur during blanking. As shown in FIGURE 2, the output of the horizontal and vertical positioners 60, 62, in combination, control video generator 64 in the generation of symbol 1, the video generator 64 operating to generate the symbol only when a control pulse is received from both generators 60, 62.

More specifically, video generator 64 includes a set of horizontal circuits for providing the signal waveshape which is effective as coupled to the electron gun of a display tube 18 to determine the character of the symbol during each trace of a horizontal line in which the symbol is traced, and basically includes a horizontal clock gate 100, a horizontal counter 102, a horizontal preset gate control 104 and horizontal control gates 106. Video generator 64 includes a similar set of circuitry for providing a vertical waveshape which determine the character of the symbol during the successive horizontal line traces in which the symbol is traced and such circuitry includes vertical clock gate 108, vertical counter 114, preset gate control 112 and gate 110.

Referring first to the horizontal portion of the signal generator circuitry 64, with the receipt of a coincident pulse over conductor 94 from the horizontal positioner circuit 60 (which will occur during each line trace but will be without effect in the provision of a video pulse until such time as the vertical circuitry indicates the raster has advanced to the initial vertical coordinate of the symbol), the horizontal clock gate 100 gates the master clock pulses (5 mc. pulses) on conductor 116 to the binary counter 102 which has the capability of the maximum count required for the horizontal dimension of the symbol (i.e., the maximum count is determined by the desired symbol size). The binary counter 102 counts the clock pulses at such time, and as shown shortly, operates with preset gate (or decoding network) 104 at preselected ones of the counts of the clock pulse to generate a predetermined waveshape for coupling to the display means.

In a similar manner, vertical clock gate 108 is operative with the receipt of the coincidence pulse over conductor 95 from the vertical positioner symbol 62 to initiate operation of the vertical binary counter 114, which thereupon counts each horizontal sync signal output by the timing generator 80 (each successive sync pulse occurring at the time of initiation of the trace of a successive line on the raster). The counter 114 has the capability of the maximum count required for the vertical dimension of the symbol to be displayed, and as will be shown, operates with gate controls 112 at preselected counts after coincidence to generate a predetermined waveshape.

With reference once more to the horizontal circuitry of the video generator 64, the counter 102 provides an indication of the successive counts, and as each one of predetermined numbers in the count is reached, the preset gate 104 operates to control gate 106 in the provision of video and/or blanking pulses which result in the horizontal waveshapes of FIGURE 6A, As will be shown, the horizontal waveshape is generated during each horizontal trace of the raster, but the waveshape is not transmitted to the display means unless a predetermined gating is provided by the control gate 110. In a similar manner, the vertical pulses generated will not be transmitted to the display device 18 unless a predetermined gating is provided by the horizontal gates 106.

In the present embodiment preset gate 104 in the horizontal section is preset to provide a horizontal waveshape comprised of a negative pulse at count 1, a positive pulse at count 2 which is maintained through count 8 (at which time a negative pulse is produced), and at count 9 the waveshape is terminated. At the conclusion of the maximum count set into the horizontal preset gate 104, a feedback pulse is applied over OR gates 106, conductor 128, and the horizontal clock gate 100 to disable the gate 100, and to reset the counter 102 to zero in anticipation of the next coincidence positioning pulse from the horizontal positioner circuit 60, which as noted above occurs during each horizontal line trace of the raster.

The vertical circuitry in the video generator circuitry 64 is operative in a similar manner to generate pulses at the counts established by the preset gates in the memory or gate control circuit 112 (FIGURE 6A, vertical waveshapes). Gates 110 are operative with gates 106 to pass the generated signals over white or black conductors 120, 122, as the case may be, to the video amplifier 124 and the electron beam source 126 of the display means 18. At the conclusion of the maximum count for the vertical signal (determined by the vertical size of the symbol) a feedback pulse is applied over conductor 130 to the master clock gate 103 for the vertical circuitry to disable the gate 108, and reset the vertical counter 114 to zero in anticipation of the receipt of the next positioning pulse over conductor 95 from vertical positioner 62.

As noted above, and as will be shown in more detail hereinafter, the control gates, such as 106, 110, in the generator for a symbol (such as symbol 1) are interconnected to both the horizontal and vertical pulse responsive circuits in the video generator, such as 64, and in the generation of a symbol (other than a horizontal or vertical line) a predetermined circuit condition must occur in both the horizontal and vertical control circuitry (such as 102, 104, 106, 110, 112, 114) precedent to the generation of a white video or black video pulse which results in the display of the symbol on the display means 18.

White video conductor 120 and black video conductor 122 are utilized in coupling the output signals to the video amplifier 124 which may comprise a standard video amplifier used for such purpose in the television field. All video signals are generated as positive pulses and separated into white video and black video pulses. The black video pulses are mixed and inverted in the system as hereinafter described.

As shown in FIGURE 2, roll means 127 are connected to control the position of a rotatable deflection yoke 86 on the display tube 18. Thus, with receipt of signals from the stable platform 20 over roll conductor 24 to indicate roll of the aircraft about its roll axis, roll means 127 are operative to effect mechanical rotation of the deflection yoke 86 on the display device 18 to thereby effect rotation of the display including the horizon line about the horizontal axis.

In that the present display is defined in terms of Cartesian coordinates, it is apparent that the rotation of the display may also be achieved electronically by varying the signal output of the computer according to a formula which represents the angle of rotation of the aircraft about the roll axis.

As indicated heretofore, the symbol positioning circuitry 60, 62 and video generator circuitry 64 for symbol 1 is generally representative of the circuitry which is utilized in the generation of other symbols displayed on the display means, and the generating circuitry for such other symbols differs primarily in the preset information stored in the memory gates, such as 104, 112, to predetermine the shape and definition of the symbol displayed on the display means 18.

SPECIFIC DISCLOSURE OF POSITIONER
VIDEO GENERATOR FOR SYMBOL 1

(a) *Structure*

It is once more noted that the display raster is divided into 525 horizontal lines (262½ line pairs of 248 viewable pairs) and each of these horizontal lines is divided into 248 segments. During each raster trace, counter means provide signals which indicate the extent of progress of the beam in the trace of the raster both as to the one of the horizontal lines being traced (Y coordinate) and the position or segment on the line at which the beam is located (X coordinate). Storage circuit means in the positioner 60 store the digital information which indicates the desired position of the symbols on the raster, and comparator means provide a coincident pulse to the symbol video generator 64 whenever such position is reached by the electron beam in its trace.

The display raster is thus divided into a plurality of elements, each of which is approximately 1/32 of an inch square, and each of which can be defined in terms of an X, Y coordinate in the raster trace.

The circuitry of the present disclosure describes each of such coordinates by two nine bit digital words. Thus, a basic symbol, such as symbol 1, symbol 2, or the like, will have a first nine digital word to describe the initial X coordinate of trace, and a second nine digital word to describe the initial Y coordinate of trace. As the initial X, Y coordinates of a symbol are detected by the positioner for such symbol, the associated generator equipment for such symbol is operated to generate the signals necessary to display the symbol on the display. It is once more noted that the raster trace in the present embodiment proceeds from the bottom marginal edge toward the upper marginal edge of the display.

As shown in FIGURES 1 and 6A, symbol 1 comprises a square having a black outline or perimeter one element in width. In that the raster is traced from the bottom of the target toward the top, the initial or start X, Y coordinates for symbol 1 will determine the location of point A of the symbol (FIGURE 6A). With reference now to FIGURE 4, the horizontal positioner circuit 60 for determining the X coordinate of a symbol is set forth in more detail thereat. At the position shown in FIGURE 1, the symbol start coordinates will be $X=120$, $Y=150$.

As noted above, each symbol position word representative of the initial "X" coordinate of the symbol (120 in the present example) is received over conductor SP from the computer in bit serial form (nine bits per word in the present embodiment) and is stored in the nine flip-flops, such as 235, 238, etc., of shift register 66. The information is supplied at the computer rate which is different than the raster rate of the display unit 18, and is transferred in parallel (one bit or its complement on each of eighteen wires) to the eighteen "AND" circuits, such as 270, 272, etc., of transfer gate 68.

The transfer gates 68 are disabled until a positive gate pulse is applied over word space conductor WSP, which pulse is provided by the computer 12 at the end of each word fed to the shift register 66 by the computer 12. Thus the transfer gates 68 will only transfer a complete word from the shift register 66 to the storage unit 70.

The two output circuits of each pair of gates of the transfer gates 68 associated with each bit are connected to the two input circuits of nine flip-flop circuits 306–322 in the storage circuit 70 by means of crossover connection. Accordingly as each WSP pulse is received flip-flops 306–322 in the storage unit 70 are properly triggered to a state identical to the corresponding flip-flops 235–239 in the shift register 66. As a result, a complete word will always exist in the storage unit 70, and the word will remain in the storage unit 70 until another complete word is registered in the shift register 66 by the computer and transferred thereto by the intermediate circuitry.

The word stored in the storage unit 70 (coordinate X which is 120 in the present example) is continually available to the comparator circuit 72 for comparison with the signal set which continually represents the position of the beam in its trace of the raster on the display means 18. Whenever the word stored on storage device 70 (120 herein) represents the horizontal coordinate being traced by the beam, as indicated by the information supplied to the comparator 72, a coincidence pulse is transmitted over conductor 94 to the video generator 64 for symbol 1.

With reference now to FIGURE 4, the circuitry of the various circuits is now described in more detail. As there shown shift register 66 comprises nine flip-flop circuits 235, etc., each of which is operative to store a different one of the bits in the word received over the symbol positioner conductor SP from the computer 12. Shift registers are well known in the art, reference being made for example to the showing in Digital Counters and Computers, Bukstein, page 166 published by Rinehart and Company, Inc., New York, copyright 1960. Assuming the waveform illustrated adjacent the vertical conductor SP comprises the nine bits received in the signal ($X=120$), flip-flops 235, etc., will be operated to the positions indicated by the waveform in FIGURE 4.

Each of the flip-flops 235, etc., in the shift register 66 has a pair of output circuits, the output circuits of successive ones being identified as $\overline{A}'$ and $A'$, $\overline{B}'$, $B'$, $\overline{C}'$, $C'$, etc. Each pair of output circuits, such as $\overline{A}'$, $A'$, is connected to the input circuits of a pair of associated "AND" gates, such as 270, 272, in the transfer gates 68.

The second input lead of each "AND" gate, such as 270, 272, is connected to the word space pulse conductor WSP. The output circuits of each pair of AND gates, such as 270, 272 are connected in a crossover manner to the inputs of an associated one of the storage circuits (flip-flops) 306, 308, etc., in the storage circuit 70.

As noted heretofore, computer 12 is operative, only after storage of a complete word on shift register 66, to transmit a positive pulse over the word space conductor WSP to the one input conductor of each of the AND gates 270, 272, etc. The "AND" gates 270, 272, etc., transfer the information stored on the shift register flip-flops 235, 238, etc., to the storage flip-flops 306, 308, etc.

By way of a specific example, it will be recalled that the first flip-flop 235 in the shift register 66 was operated to the $\overline{A}'$ position (bit 1) responsive to the receipt of the word $X=120$ as indicated adjacent conductor SP. Accordingly, the input $\overline{A}'$ for gate 270 will be marked "1" and the input circuit $A'$, will be marked "0." The "1" in the present embodiment is used to indicate a positive output and the "0" is used to indicate a negative or no output. With the receipt of the transfer pulse over conductor WSP, only the transfer gate 270 of the pair 270, 272 will operate, and at its output circuit operates flip-flop 306 to provide output signal "0" over output circuit $A'$ and output signal "1" for output circuit $\overline{A}'$. It is apparent therefrom that the markings on the storage gate 306 are the same as on the corresponding gate 235 in the shift register 66. Each of the other storage gates 306, 308, etc., of the storage circuit 70 will be operated in a similar manner to receive the information registered in the corresponding one of the flip-flop circuits 235, 238, etc., in shift register 66, and accordingly word 120 is registered thereon.

As soon as the word space pulse is removed from the conductor WSP, transfer gates 68 are once more disabled, and a further word may be transmitted by the computer 12 over word SP to the shift register 66.

It will be recalled that the word stored on the storage circuit 70 represents the initial horizontal coordinate (X) on the raster at which the symbol is to be reproduced, and that the storage circuit 70 continually provides such information to the comparator 72.

Such information is coupled from each storage flip-flop, such as 306, over an associated conductor pair, such as 326, 331, to associated AND gates, such as 324, 332 in the comparator circuit 72. The first set of AND gates, 332 and 324 of the comparator circuit 72 each have a second input circuit connected to conductor $\overline{DC}$ over which output pulses are received from clock 88 (FIGURE 2) and are slightly delayed in time to the pulses DC as disclosed more fully hereinafter. The further stages of the comparator are coupled in sequence with each other by means of "OR" circuits 340, 346, 352, 358, 364, 370, 376 and 382. Thus as shown, the second stage of the comparator 72 comprises AND gates 342, 344, each of which has one of its input circuits connected to the output $\overline{B}'$, $B'$, respectively, of the second gate 308 in the storage circuit 70; a second input circuit connected over an OR gate 340 to the output of gates 332, 342 in the first stage; and a third input circuit connected to the output circuits B, $\overline{B}$ of the second stage $2^1$ of the binary counter 92. As noted above, the binary counter 92 continually provides a representation to the comparator 72 of the horizontal coordinate of the beam in the raster trace.

With reference thereto, it will be apparent that binary counter 92 comprises nine flip-flops 392, 396, etc., which are operative to count the incoming pulses received over conductor 90 (DC) from the display clock 88 in the manner of known binary counters. The binary counter 92 is reset responsive to the receipt of each horizontal sync pulse and as the display clock pulses are received over conductor 90, the counter advances, and the flip-flops 392, 396, etc., are operative at their outputs A, $\overline{A}$ . . . J, $\overline{J}$ to provide markings in the binary code which continually represent the horizontal coordinate or segment at which the beam is located at such time in its trace of a horizontal line. As a specific example, as the beam starts the trace of a horizontal line, the output count is zero; as the beam reaches the center of the trace, the counter will have advanced to count 124, etc.

The two output conductors for each stage of the binary counter 92 are connected to a set of AND gates in the comparator which represent the corresponding bit of a word. Thus the first stage 392 which represents bit $2^0$ in the binary count is connected over conductors 330, 334 to the one input circuit for the first stage AND gates 332, 324 in the comparator 92. As will be shown, AND gates 324, 332 compare the bit in storage gates 306 with the bit in counter gate 392 and if the bit is the same, one of the AND gates 332, 324 operates to send a coincidence signal over OR gate 340 to the next stage in the comparator. If all stages register coincidence, a coincidence pulse is transmitted over conductor 94.

(b) *Operation*

In more detail, at the start of each horizontal line trace, the timer circuitry 16 (FIGURE 2) transmits the horizontal sync signal over conductor "$h$" to binary counter 92 which resets the counter. An initial output corresponding to the master oscillator frequency designated $\overline{\text{Display Clock}}$ ($\overline{DC}$) (FIGURE 2) is coupled over conductor ($\overline{DC}$) to the input of AND gate 332 and 324 in the comparator 72 to condition the comparator for operation. The input pulse is a positive pulse slightly delayed in time to the pulse which is transmitted by the display clock over the conductor DC to the counter 92 to indicate that the electron beam is positioned at the first segment of the horizontal line being traced. In the present embodiment, the master clock waveform is a five megacycle square wave, which is differentiated, and the input to the binary counter over conductor DC is the positive portion of the differentiated pulse, and the input to the comparator 72 over conductor $\overline{DC}$ will be the negative portion of the differentiated pulse, inverted to provide positive pulses slightly delayed with respect to those on conductor DC.

The first bit of the word in the first counter gate 392 may be A or $\overline{A}$, and the first bit of the word in the storage gate 306 may be $A'$ or $\overline{A}'$, and the output conductors 330, 334 for the first stage 392 of counter 92 and the output conductors 326, 331 for the first stage 306 of storage circuit 70 will be marked accordingly. As count 1 is placed in the binary counter 92, the input circuits 334, $\overline{DC}$ and 326 for gate 332 in the comparator 72 will be marked, respectively, with (a) a signal "1" for the first bit (assuming count 1 has just been placed in the counter), (b) the $\overline{DC}$ signal, and (c) a signal "1" for the first bit or no signal "0" depending upon the first bit of the word stored in the storage circuit 70.

The input circuits 330, $\overline{DC}$, and 331 for gate 324 will be respectively marked with "0" (since a "1" has been placed in the first counter storage 392), the $\overline{DC}$ signal, and a signal "0" or "1" depending upon the first bit in the first storage stage 306.

In the present example ($X=120$), as the digit one is entered in the counter, the bit in the first counter stage 392 is bit $A=1$ and the bit in the first storage gate 306 is $A'=0$, and $\overline{A}'=1$. Upon arrival at gate 332 of the pulse on conductor $\overline{DC}$, and the signal "0" exists on conductor 326 and gate 332 is inhibited to provide output "1" and the output of the upper AND gate 332 will be "0." Similarly at the input of AND gate 324 the signal "0" exists on conductor 330 and the signal "1" exists on conductor 331 and AND gate 324 is inhibited so that the output of the lower gate 324 will be "0." The OR gate 340 will therefore provide an output "0" during the time of the pulse on conductor $\overline{DC}$ and signal transmission through pulse comparator 72 is blocked.

As the binary counter 92 advances to count 2

$$\left(\text{binary} \begin{array}{c} JHGFEDCBA \\ 000000010 \end{array}\right)$$

the state in the first counter stage is $A=0$, $\overline{A}=1$. Again, in the present example, ($X=120$) $A'=0$, $\overline{A}'=1$. Upon arrival at gate 324 of the $\overline{DC}$ pulse on conductor 328, each of the inputs to AND gate 324 in a comparator is "1" and gate 324 will provide output "1" during the time of pulse $\overline{DC}$ to OR gate 340. The output of gate 332 will be "0" since both inputs A, A' are "0." The output of OR gate 340 will therefore be "1" during the time of pulse $\overline{DC}$.

If a different coordinate having the first bit $\overline{A}'=1$ is used as an example, when the bit in the first counter stage 392 is $A=1$, and the bit in the first storage stage 306 is $A'=1$, each of the inputs to gate 332 will be one, and each of the inputs to gate 324 will be zero. The output of gate 332 will be 1 and the output of gate 324 will be "0." The output of the OR gate 340 will also be "1." Thus in either case when coincidence occurs between the bits in the first counter stage 392 and the first storage stage 306, one of the gates 332, 324 operates to provide output signal "1" to OR circuit 340.

It will be readily apparent therefore that in the present example ($X=120$) as the binary counter 92 reaches count 120 all stages of the binary counter 92 and the storage circuits 70 are in identical binary states and transmission of $\overline{DC}$ through the pulse comparator 72 is effected.

Stated summarily, if the bits in the corresponding gates or stages in the counter and storage circuits are the same, one of the comparator gates for such stage will have an output of "1" and the output of the associated "OR" gate is "1."

If the bits in a corresponding storage stage and counter stage are not identical, the output of both AND gates associated therewith in the comparator circuit 72 will be zero, and the "OR" gate for such AND gate pair will have a zero output.

With reference to each stage in the comparator 72 subsequent to the first stage, one input circuit for each AND gate of a pair for a stage (i.e., one input for AND gates 342, 344 which is the pair of gates which compare the bits in the second stage $2^1$ of the storage and counter circuits) is connected to the output of the "OR" gate for the preceding stage (i.e., OR gate 340 connects to the input of gates 342, 344).

It is apparent therefore that a comparison can be made in a succeeding stage only if the output for the previous stage is "1" as the result of identical storage bits being registered in the counter and storage gates for such stage. If any one of the comparator stages indicates that the bits in the corresponding counter storage gates are different, the comparator stage for such pair provides a zero output, and the output of the successive stages is also zero.

If the comparison is made, and each comparator stage indicates that each bit of the word in the storage circuit 70 is the same as the count on the binary counter 92, the output of the "OR" circuit in each stage including the last OR circuit 390 is "1" and such marking is extended over conductor 94 to the video generator circuit (FIGURE 5) which is associated therewith. The coincidence pulse thus provided to the symbol generator is referenced in time to the display raster since both are referenced to the master oscillator.

Vertical positioner 62 (FIGURE 2) includes a counter (not shown) which is driven by the horizontal output pulses "$h$" of timer circuit 16 and continuously provides a count of the pulses to the comparator in the vertical positioner 62, whereby the comparator in the vertical circuitry will at all times have the identification of the vertical coordinate "Y" (i.e., the horizontal line being traced) registered therein. As the trace (and the counter in the vertical positioner 62) advances to the count which corresponds with the word received over the SP conductor and stored in the positioner 62, a coincidence pulse is transmitted over conductor 95 to the video generator 64 for symbol "1." As the X, Y coordinates of the initial position of the symbol are indicated to the video generator 64 in such manner, the generator 64 operates to generate the signals required to display the symbol on the display tube 18.

SYMBOL VIDEO GENERATOR (a) *Structure of video generator*

The manner in which video generator 64 (FIGURE 5) is operative responsive to receipt of the coincident signals from the horizontal positioner circuit 60 and vertical positioner circuit 62 to effect the generation of the symbol which has been preset in the circuits thereof, will now be shown. In the present example, the circuits of the video generator 64 have been preset to generate symbol "1" which consists of a square (FIGURE 6A), and which may be used for any number of purposes including, among others, the impact point or ultimate destination of the aircraft.

With reference first to the illustration of FIGURE 2, it is apparent that the video generator 64 basically comprises horizontal clock gate 100 which is operative responsive to the receipt of the coincidence pulse over conductor 94 (indicating the horizontal coordinate of the symbol to be positioned) from the horizontal positioner circuit 60. Clock gate 100 in its operation initiates operation of the counter 102 in the counting of the pulses received over conductor 116 from clock 88. Preset gate 104 then produces video pulses at the specific preset pulse intervals. The resultant pulses are then gated by gate 106 and gate 110 (the latter gate being controlled by pulses on preset gate 112 activated as counter 114 operates in counting horizontal traces as initiated by a signal on conductor 95 from the vertical positioner 62) over white and/or black video conductors 120, 122 to the video amplifier 124 for amplification and coupling to the electron beam gun 126 of the display tube 18.

With reference to FIGURE 5, the input conductor 94 is connected to flip-flop 435 in clock gate 100, which has two outputs $\overline{G}$ and G. The first output G of flip-flop 435 is connected over conductor 437 to one input of AND gate 439. The second input for gate 439 is connected over conductor 116 to display clock 88. The output of AND gate 439 is connected to couple a number of display clock pulses to counter 102 after receipt by clock gate 100 of the pulse from the horizontal positioner 60.

More specifically, the counter 102 is a conventional binary counter having four stages 443, 449, 455, 461 ($2^0$–$2^3$) as indicated by the legends in FIGURE 5 having a count capability of fifteen pulses. The sixteenth state is assigned as standby (no video produced). The input of the first stage 443 is connected to the display clock gate 439, and a second input circuit is connected over conductor 441 to the $\overline{G}$ output circuit of flip-flop 435. Each stage has two output circuits, such as D, $\overline{D}$, C, $\overline{C}$, B, $\overline{B}$, and A, $\overline{A}$. One input circuit of each succeeding stage is connected to the "NOT" output of the preceding stage. Thus, as shown, the C input circuit for the second stage 449 (C, $\overline{C}$) is connected over capacitor 487 to the output circuit $\overline{D}$ of the first stage 443. The second input circuit in each stage is connected over conductor 441 to the $\overline{G}$ output circuit of flip-flop 435, which circuit resets the counter after the predetermined signal generations in each horizontal line trace.

The eight output circuits of the binary counter 102 are connected to the inputs of the preset gate control circuit 104 in accordance with the nature of the symbol to be produced on the display. In the present example, the preset gate control circuit 104 includes "AND" gates 465, 469, 475 and 481. The truth table (FIGURE 6E) indicates the connection of the gates 465, etc., to the outputs of the counter 102 to effect the operation of the gates in the generation of the signals at the desired time in the raster trace of the horizontal line necessary to provide the horizontal waveshape of FIGURE 6A.

With reference to the input connections to preset gate 465 (FIGURE 5) and the truth table (FIGURE 6E), it will be apparent that gate 465 will operate when the counter 102 advances to the ninth count, since at that time the count will be represented at the output of counter 102 by $A=1$, $B=0$, $C=0$, and $D=1$. Therefore, $\overline{B}=1$, $\overline{C}=1$ and all inputs to gate 465 are 1. Since the input circuits for preset gate 465 are connected to such conductors, gate 465 will operate. In a similar manner, gate 469 operates when the counter advances to one, gate 475 operates at count eight and gate 481 operates at count two.

The outputs of preset gates 465 and 469 are connected to the input circuits for flip-flop 485, which is operative as a horizontal video gate for black video pulses. One output circuit (M) of the horizontal black video gate 485 is connected over conductor 487 and capacitor 488 to the reset circuit for flip-flop 435. The second output circuit of the gate 485 ($\overline{M}$) is connected over conductor 489 to an input circuit of the first black video AND gate 600. Horizontal black video gate 485 provides output 1 over conductor 489 to black video gate 600 from count 1 to count 9 of counter 102. As will be shown, AND gate 600 operates only with receipt of coincidence pulses from the horizontal black video gate 485, and a signal from the vertical preset gates 112 in the video generator. Black video OR gate 121 couples pulses over black video conductor 122 whenever the first AND gate 600 or the second AND gate 500 operate.

With reference once more to preset control gate 469 in the horizontal control section of the video generator 64, the output circuit of the preset gate 469 is connected over conductor 473 to one input circuit for the OR gate 491, and the output of the third preset control gate 475 is connected over conductor 478 to the second input circuit for the OR gate 491. As indicated by the symbology adjacent conductors 473, 478, with operation of the counter 102 to count one, the control OR gate 491 operates to provide output "1" over conductor 493 to the second black video AND gate 500. In a similar manner, with operation of the counter 102 to count eight, the third preset gate 475 provides an output 1 over conductor 478 to "OR" gate 491, which in turn transmits output "1" to black video AND gate 500.

AND gate 500 has a second input 501 which is controlled by the vertical control section of the video generator 64 as will be shown. The output of the second black video gate 500 is connected over the second input circuit of OR gate 121 to black video conductor 122.

The third preset gate 475 is also connected over conductor 479 to a first input circuit for flip-flop 495. The output of the fourth preset gate 481 is connected to the second input for flip-flop 495. At count two on the counter 102, the fourth preset gate 481 operates flip-flop 495 from the N to the $\overline{N}$ condition, and at count eight on the counter 102, gate 475 operates flip-flop 495 back to the N condition. Between counts two and eight the output circuit 497 ($\overline{N}$) of flip-flop 495 couples an output "1" to one input circuit of white video AND gate 119. When a similar pulse is received over conductor 597 from flip-flop 595 in the vertical portion of the video generator, AND gate 119 operates to provide an output signal to the white video conductor 120.

The vertical control portion of the video generator for symbol 1 is similar in structure to the horizontal control portion just described, the vertical portion however being connected to determine the horizontal lines in the raster trace during which the symbol is to be generated. Briefly, the vertical portion includes a clock gate 108, including a flip-flop 535 which is connected over conductor 95 to be transferred from condition $\overline{F}$ to condition F responsive to receipt of the coincidence pulse from vertical positioner 62 (FIGURE 2) indicating that the raster has proceeded to the line in which the initial coordinate of the symbol is to be traced.

The output circuit F of flip-flop 535 is connected to AND gate 539, and with the operation of flip-flop circuit 535 to the F condition, gate 529 couples horizontal sync pulses "h" to four-stage counter 114 which is identical to counter 102 in the horizontal control portion. However, counter 114 is advanced by the horizontal control portion. However, counter 114 is advanced by the horizontal sync pulses, and once the counter 114 is energized it advances one count as each line trace is effected on the raster. Counter 102, however, is advanced by the display clock pulses which occur at the rate of two hundred forty-eight pulses for each such line trace.

Preset gate control 112 includes AND gates 565, 569, 575 and 581 which are connected to the output circuits of the vertical counter 114 to effect the operation of gates 110 at the predetermined intervals necessary to effect generation of the vertical waveshape (FIGURE 6A). As will be shown, gate 110 includes flip-flop circuit 585 which at output P controls the reset of the clock gate circuit 108, and at output $\overline{P}$ determines the line traces in the raster during which AND gate 500 in the horizontal circuitry of video generator 64 is enabled to couple black video pulses to the display device.

OR gate 591 determines the lines in the raster trace during which AND gate 600 couples black video pulses to the display device, the AND gate 600 being also controlled by a horizontal control section which determines the segments during the selected line trace in which the black video AND gate 600 being also controlled by a horizontal control section which determines the segments during the selected line trace in which the black video AND gate 600 will couple such pulse to the display device.

Flip-flop 595 determines the particular lines during the vertical trace during which the video gate 119 is operative to couple white video pulses to the display device, the AND gate 119 being also controlled by the horizontal section, whereby the AND gate 119 is operative during only certain segments of the lines selected by flip-flop 595.

(b) *Operation of video generator*

With reference to FIGURE 6A, the specific manner in which the control circuitry operates to provide symbol one, which in the present embodiment is comprised of a white square outlined by a black line, is now set forth.

With the occurrence of count one and count eight in each horizontal line trace, the horizontal portion of the video generator 64 generates pulses for marking the black video conductor 122 as shown by the horizontal waveshape in FIGURE 6A for a period of one count. One black video pulse as coupled to the display device 18 results in the display on the raster of a black element $\frac{1}{32}''$ wide. It will be apparent from FIGURE 6A that white video pulses are generated by the horizontal circuitry for the six counts (2 through 7) between the black pulses (1 and 8) in each horizontal trace. As will be shown, the vertical control section of the video generator 64 determines the specific lines during each raster trace for which the horizontal waveshape is coupled to the display tube 18. The vertical control portion further provides a black video pulse for certain line traces of the raster (counts one and eight as shown in FIGURE 6A) and the horizontal portion of the circuitry determines the period in each horizontal trace during which such pulses are coupled to the display means.

The specific manner in which the circuitry operates to effect such signal generation is now set forth. It is once more recalled that the video generator 64 couples output pulses over conductors 120 and 122 to the display device only after being activated by pulses from horizontal and vertical positioners 60, 62 indicating that the electron beam is positioned at the initial X, Y coordinates of the symbol. That is, even though the horizontal waveshape will be generated during each horizontal trace at the appropriate X coordinate, the waveshape will not be extended to the display unit until such time as the raster progresses to the line (identified by the vertical coordinate) at which the initial element of the symbol is to appear on the raster. In the present embodiment in which the raster sweep progresses from the bottom to the top of the display, the first progresses to be traced will be element A (FIGURE 6A). As noted above, it is assumed for purposes of the present example, that the computer word indicates that the initial coordinates of the symbol are to be located at the coordinates $X=120$, $Y=150$.

During the period that the raster trace progresses from the bottom marginal edge to vertical line 150, the output of the $\overline{R}$ conductor for the flip-flop 595 in the vertical section is "0," and the white video AND gate 119 is prevented from gating pulses generated by the horizontal portion of the video generator 64.

Assuming now that the raster has advanced to line 150, a coincident pulse is coupled over conductor 95 (FIGURE 5) to the vertical clock gate 108, and flip-flop 535 operates to the condition in which F is 1 and $\overline{F}$ is 0 to condition AND gate 539 for operation. With the receipt of the next horizontal sync pulse (line 151), AND gate 539 operates to provide a pulse over conductor 542 to the first stage 543 of the vertical counter 114.

The vertical counter 114 operates to register count 1 ($W=X=Y=Z=1$, see FIGURE 6E) and gate 569 provides output "1" over conductors 571, 573 to the inputs of vertical black video flip-flop 585 and OR gate 591. Vertical black video flip-flop 585 operates to the condition in which $\overline{P}$ is "1," and black video gate 500 in the horizontal section is prepared for operation. OR gate 591 is opened, and its output "1" prepares AND gate 600 for operation. Since the vertical counter 114 remains at such count during the entire trace of line 151, the foregoing gates are maintained in the described condition during the trace of line 151.

As the trace of line 151 advances to the coordinate registered in horizontal positioner 60 ($X=120$), the positioner transmits a coincidence pulse over conductor 94 to flip-flop 435 in clock gate 100. Flip-flop 435 operates, and as the next clock pulse (121) is received over conductor 116 from display clock 88, AND gate 439 operates the binary counter 102 to count 1 ($\overline{A}=1, \overline{B}=1, \overline{C}=1, D=1$), and preset gate 469 operates flip-flop 485 to the condition in which $\overline{M}$ is "1." In that both input circuits of AND gate 600 are now "1," AND gate 600 operates, and OR gate 121 extends a black video pulse over conductor 122. Since flip-flop 485 which controls one input for AND gate 600 remains in such condition for a total of eight counts or segments of the horizontal line, and the gate 591 which controls the other input for AND gate 600 remains in such condition for the entire trace of raster line 151, the AND gate 600 provides an output pulse (FIGURE 6A) which generates the lower black marginal line of the symbol during the next eight horizontal counts 121–129 of the raster line 151.

It should be noted that during the first count of the symbol generation, gate 469 in the horizontal section operates, and in turn, operates OR gate 491. The output of OR gate 491 on conductor 493 is now "1." Since both inputs to the black video AND gate 500 are now "1," the output of AND gate 500 is 1, and the second input circuit 121 also gates a black video pulse to black video conductor 122 (i.e., the lower input circuit to OR gate 121, as noted above, is enabled for counts 1–9 in line 151 by gate 600). Gate 469 terminates the pulse provided by gates 491, 500 and 121 at count 2. At count 8, gate 475 gates a black video pulse in a similar manner. Since AND gate 600 couples a black video pulse to gate 121 for eight counts, the operation of gate 500 during counts 1 and 8 in the first line trace of the symbol is without additional effect.

As the trace of the line 151 advances to the ninth count ($X=129$ in the present example) flip-flop 485 operates to the condition in which M is "1" and $\overline{M}$ is 0. As a result, AND gate 600 closes to terminate the gating of black video pulses over conductor 122 (see point B—FIGURE 6A).

Simultaneously, flip-flop 485 over output circuit M, conductor 487 and capacitor 488 effects reset of the clock gate 435 to the normal state (G is 0, $\overline{G}$ is 1) to thereby close gate 439, and reset flip-flops 443, 449, 455 and 461 in horizontal counter 102 to zero.

The trace of raster line 151 continues in a conventional manner. As the trace of the next line 152 is initiated, a horizontal sync signal is coupled over conductor "$h$" to gate 539 in the vertical section of video generator 64, and the counter 114 advances to count 2 ($\overline{W}=1, \overline{X}=1, Y=1, Z=1$). Preset gate 569 closes as count 1 is removed, and accordingly black video gates 591 and 600 will not operate during the trace of line 152. Flip-flop 585 remains in the condition $\overline{P}$ is "1." As count 2 is registered, gate 581 opens to operate white video flip-flop 595 to the state in which the output of $\overline{R}$ is "1" and the one input circuit 597 for white video AND gate 119 is "1."

The trace of line 152 progresses, and as the trace advances to element 120, the horizontal positioner circuit 60 couples a coincidence pulse over conductor 94 to flip-flop 435 in clock gate 100, and the horizontal section of the video generator 64 operates in the manner described above. Briefly, flip-flop 435 prepares gate 439, which opens as the next display clock pulse is received over conductor 116, and counter 102 advances with each of the clock pulses received thereover.

With operation of the counter to the first count $\overline{A}=1$, $\overline{B}=1, \overline{C}=1, D=1$ (as the raster traces element 121), OR gate 491 opens to condition input circuit 493 of black video AND gate 500. It will be recalled that the black video flip-flop 585 in the vertical section was operated to the $\overline{P}$ output "1" during the trace of the first line of the symbol (line 151) and as will be shown, the flip-flop remains in such state until the last line (159) including the symbol is traced.

Accordingly, black video gate 500 opens for count 1 of counter 102 (horizontal count 121) during the trace of the second line 152 of the symbol generation to couple a black video pulse over OR gate 121 to black video conductor 122, (see point C—FIGURE 6A).

As the next display clock pulse (raster count 122) is coupled over conductor 116 and AND gate 439, counter 102 advances to the second count ($\overline{A}=1, \overline{B}=1, C=1, \overline{D}=1$), and preset gate 469 is disabled whereby OR gate 491 and AND gate 500 terminate the black video output pulse which was extended over conductor 122 for the first count of the second line in the symbol trace (C–D, FIGURE 6A).

It will be recalled that during the first line of the symbol the AND gate 600 in gate 110 was maintained open during counts 1–9 of the symbol trace. However, during the second line trace preset gate 569 (count 1 in the vertical section) is disabled, and accordingly there is no pulse on the black video conductor 122 (see point D, FIGURE 6A), as the second horizontal count occurs during the second line of the symbol generation (count 122 on line 152 in this example).

At this time (point D, FIGURE 6A) the circuitry initiates trace of the white portion in line 152. That is, as the counter 102 in the horizontal section advances to count 2, preset gate 481 operates and white video flip-flop 495 shifts to provide an output "1" over output circuit $\overline{N}$ and conductor 497 to the second input circuit of AND gate 119. Since the white video flip-flop circuit 581 in the vertical section was shifted to condition the first input circuit 597 for white video AND gate 119 at the start of the trace of the second line of the symbol (line 152 in the present example), AND gate 119 opens to couple a white video pulse over conductor 120 to the display device (see point D, FIGURE 6A).

As the third display clock pulse (count 123) is coupled to counter 102, gate 481 is disabled. However, white video flip-flop 495 is bistable and remains in the state $\overline{N}=1$ until a further transfer pulse is received over conductor 479. Accordingly, a white video pulse is maintained on white video conductor 120 until symbol count eight ($A=1, \overline{B}=1, \overline{C}=1, \overline{D}=1$) is received.

As the counter 102 advances to the eighth symbol count (raster count 128), preset gate 475 operates to change the condition of flip-flop 495 back to its original state in which $\overline{N}$ is "0." Gate 119 thereupon closes to terminate the white video pulse to conductor 120 (see point E, FIGURE 6A). Preset gate 475 also opens OR gate 491 and gate 500 to provide a signal over black video conductor 122 for the period of count eight (raster count 128 in the trace of raster line 152—see point E, FIGURE 6A).

As the next display clock pulse is received to advance the horizontal counter 102 to symbol count 9 ($A=1, B=1, \overline{C}=1, C=1$), (raster count 129) the preset gate 475 closes to effect closing of OR gate 491 and AND gate 500 to terminate the black video pulse (see point F—FIG- URE 6A). Preset gate 465 operates flip-flop 485 to its original state. Flip-flop output circuit M is now "1" and the flip-flop 435 in clock gate 100 is restored to its original condition to reset counter 102 in the manner previously disclosed preparatory to the trace of the next horizontal line of the raster (raster line 153).

The manner in which the remaining portion of the symbol is traced will be apparent therefrom. As the trace advances to the eighth symbol line (raster line 158 in the present example) preset gate 575 (W, $\bar{X}$, $\bar{Y}$, $\bar{Z}$) opens to control OR gate 591 and AND gate 600 in the coupling of a pulse to black video conductor 122 for the entire portion of the horizontal line 158 in which the symbol is traced (see G–H, FIGURE 6A), i.e., line counts 121 to 129 of raster line 158.

As the 129 count of the line 158 is reached, the horizontal section is reset as described above. As the ninth horizontal sync pulse is coupled to the vertical section (line 159) the preset gate 565 opens to reset black video flip-flop 585 to its original state. Flip-flop 585, in turn, resets flip-flop 535, closing gate 539 and resetting vertical counters 114 to zero ($A=B=C=D=0$), and the video generator 64 is completely reset for use in the generation of the symbol in a subsequent raster trace at the position indicated by the associated horizontal and vertical positioner circuits 60 and 62.

A five stage counter may be used to generate more complex symbols, reference being made, for example, to FIGURES 6B–6D as exemplary of the waveforms which may be provided to generate a second form of symbol (referred to as symbol 2). The resultant symbol will comprise a rectangle having a dark outline and a white center section which has a blank rectangular hole in the center. The waveshapes necessary for the generation of such form of symbol are shown in FIGURE 6B–6D, and the resultant symbol is shown in FIGURE 1A. The waveforms are provided by both the horizontal and vertical frequency and are combined in a manner similar to that described in the matter of symbol generation by video generator 64.

Other forms of symbols readily generated by such means include an impact point (which may be a cross symbol), a release marker (which may comprise a rectangle with the major axis thereof in a vertical direction), a pull-up line (which may comprise a horizontal black line on the path with the major axis thereof extending horizontally), roll pointers (which may be horizontal black lines on the margin of the display—FIGURE 1A), and elevation markers (which may comprise horizontal white markings on the horizontal black lines extending inwardly from the vertical margins of the display). The manner in which such waveshapes are provided will be evident from the preceding description of the operation of the video generator 64.

HORIZONTAL LINE GENERATOR

With reference now to FIGURE 1A of the drawings, there is shown a horizon line which passes laterally through the center of the display when the aircraft is in normal level flight. If the aircraft is pitched up the horizon line is moved down towards the bottom marginal edge of the display, and the thirty degree pitch line is moved downwardly from the top portion of the display in the direction of the bottom marginal edge. The manner in which the horizon line and the shading below the horizon line are generated, as well as the manner in which the different pitch lines are provided, are now set forth in more detail.

The circuitry for effecting such manner of symbol generation is set forth in FIGURES 7 and 8. Prior to a detailed consideration thereof, a brief discussion is given herewith relative to the requirements of such type display. That is, the problems involved in generating a horizon line and pitch line are slightly different from those encountered in generating the basic symbols, the main difference being that the horizon line and pitch lines must move off the display area, but must remain referenced to each other. In the present example, the system has been set up to provide a display raster which represents a "window area of viewing" of approximately 53 degrees vertically. With movement of the aircraft to different attitudes, the display indicator must have the capability of moving the center of such picture from −90 degree and +90 degree lines are referenced to the center of the display, and since the lower marginal edge of the display is removed from the center line by 26½ degrees, the elevation angle of the bottom of the raster with the aircraft in the −90 degree and +90 degree positions of the aircraft, will be −116.5 degrees and 63.5 degrees, respectively.

In the present example, six pitch lines are provided to assist the pilot (−90 degrees, −30 degrees, 0 degrees, +30 degrees, +60 degrees and +90 degrees). In that each of these lines must be referenced relative to each other, coordinate transformation is required. Since the raster which represents 53 degrees in elevation is divided into 248 line positions, it will be apparent that a representation of 180 degrees (−90 and +90 degrees equals 180 degrees) can be referenced by 0 to 846 line counts. In such arrangement, at −90 degrees the count is zero, at +90 degrees the same count is 846. Pitch line video information is correctly displayed at the screen center for the indicated attitudes of the aircraft if generated at the counts identified in the following table.

TABLE I

| | Video | Input Preset Number |
|---|---|---|
| −90 degrees | 124 | 0 |
| −30 degrees | 406 | 282 |
| 0 degrees | 547 | 423 |
| +30 degrees | 688 | 564 |
| 60 degrees | 829 | 705 |
| +90 degrees | 970 | 846 |

Since the line count for the horizon line with the aircraft at zero degrees is 547 (rather than 124—the center count of the full raster) it is apparent that a coordinate transformation has been provided, and as will be shown hereinafter coordinate transformation is important to the proper display of certain forms of symbols.

It will now be shown that a ten bit word representing elevation in the above coordinates as obtained from the platform by use of a shaft positioning coder will provide the desired display.

By way of brief outline, the input word which represents the pitch of the aircraft is used to preset a binary counter which counts the horizontal sync pulses, and as the count corresponding to the video number of any of the pitch lines is reached, that pitch line is generated. Stated in another manner, the attitude of the plane may be varied between +90 degrees and −90 degrees, and each degree of attitude through that range in attitude is represented by a different number. However, since the raster displays only 53 degrees of such range, the counter must start counting at the particular location at which the lower marginal edge of the 53 degrees to be displayed is located. Thus, in level flight, as shown by the table, the count for the horizon line video is 547. Since the total range is displayed on the display device at 53 degrees of such range, the lower marginal edge of the raster is actually at −26½ degrees. Accordingly in order for the counter to locate the horizon line at the center of the display at count 547 (124 counts above the first line displayed on the raster) the counter must be preset with count 423 as the first line of the raster is generated. The manner in which the novel circuitry is operative to provide such manner of signal generation is now set forth hereat.

With reference to FIGURES 7 and 8, the horizon and pitch positioning circuit 48 comprise a horizon symbol positioner circuit 144, and a ground plane shading and horizon line generator 200. It will be readily apparent that the positioner 48 has a number of circuits identical to those used in the symbol one positioner, and the description thereof is accordingly not repeated. Horizon symbol positioner 144 includes a shift register 601, for example, which receives a ten bit word which represents the pitch or elevation angle of the aircraft over conductor SP5 from the computer 12. The shift register 601 is similar in structure to the shift register 66 (FIGURE 4). The output of the shift register 601 comprises a ten bit word and its complement, and transfer gates 603 are operative responsive to receipt of a control pulse over conductor WSP5 from the computer 12 to transfer the word on the shift register 601 to an associated storage circuit 605. Transfer gates 603 comprise twenty AND gates similar in structure to the transfer gates 68 (FIGURE 4), and storage device 605 comprises ten flip-flop circuits similar in structure to the storage circuit 70 (FIGURE 4).

The output of storage device 605 is connected to transfer gates 607 which are operative prior to the start of each vertical raster sweep (vertical sync output pulse) to transfer such output to a line identification means or binary counter 609.

Assuming in the present example that the aircraft is in level flight (FIGURE 1A), the ten bit number which is representative of count 423 will be coupled to binary counter 609, so that the horizon line (count 547) will occur at the middle of the display as shown in FIGURE 1A as the raster is traced. If the aircraft were pitched upwardly approximately 26 degrees, the horizon line would necessarily appear at or closely adjacent to the bottom line of the raster trace, and in such event the ten bit word fed to the binary counter 609 would be 546 so that the first raster line displayed in the next raster trace will be 547 and the horizon line will be displayed as the bottom line on the raster.

Binary counter 609 comprises ten flip-flops which are capable of providing a count from 0–1,023, which is substantially the range of the counts, as noted above, representative of the different elements or angles (pitch) of the aircraft (Table I). Digressing slightly, it is noted that it is not necessary to have the complete count 1094 since at 1024 the counter will return to zero and continue counting to 71 at the screen top. Since no video is created between 0–71, the display is not affected. The counter 609 has its input circuit connected to the output of AND gate 608, which has one input circuit controlled by the horizontal sync pulses "$h$" of the timing generator 80 (FIGURE 2) and a second input circuit connected to the output of the $\overline{\text{vertical sync pulses}}$ ($\bar{v}$) (FIGURE 2). Thus, during vertical retrace (which occurs simultaneously with vertical sync), transfer gates 607 transfer the information word on storage device 605 to the binary counter 609, and in the present example, assuming level flight, counter 609 is set at count 423 responsive to the information thus received. As the vertical sync pulse terminates, $\overline{\text{vertical sync pulses}}$ ($\bar{v}$) is coupled to AND gate 608, and as the first horizontal sync pulse "$h$" is now received, the binary counter 609 advances to count 424. As each successive line of the raster is traced, a further sync pulse "$h$" is coupled to counter 609 which advances in count.

It will be apparent from the foregoing description that the attitude of the aircraft at the start of a raster trace is represented in the binary counter 609 by a predetermined number, different elevation angles being represented by different predetermined numbers. As will now be shown, as the raster progresses, and the counter advances to one or more of the counts shown in Table I, the horizon generator will be operated to generate the horizon or pitch lines identified by such counts.

More specifically, the horizon symbol positioner 144 includes a number of preset control gates including gate 611 which is preset by interconnections to initiate generation of the −90 degree line at count 124; gate 615 which is preset to initiate generation of the −30 degree line at count 406; gate 619 which is preset to initiate generation of the shading which occurs below the horizon line to indicate the ground plane at count 477; gate 623 which is preset to initiate generation of the zero degree line at count 547; gate 627 which is preset to initiate generation of the +30 degree pitch line at count 688; gate 631 which is preset to initiate generation of the +60 degree pitch line at count 829; and gate 635 which is preset to initiate generation of the +90 degree pitch line at count 970.

In the present example, the aircraft has been assumed to be in level flight and the binary counter 609 has been preset at numeral 423. The counts occurring during the raster trace will therefore be 423–671, and the ones of the gates which are preset to a number in such range will operate. In the present example, only gate 619 (count 477) and gate 623 (count 547) are within such range. Accordingly the only lines generated in this display will be the horizon line and shading beneath the horizon line. Specifically, as the count advances to count 477, gate 619 opens to change the state of flip-flop 639, to thereby initiate generation of the ground plane shading below the horizon line, in a manner more fully described hereinafter.

It is once more noted that in the present example, the raster trace is from the bottom marginal edge to the top marginal edge, and the circuitry is connected for such mode of operation. As the binary counter 609 advances from the count 423 to count 547, gate 623 for the zero degree horizon line opens OR gate 647 to effect generation of the horizon line as more fully described hereinafter. As the raster advances to the top marginal edge, the counter is operated to count 671 at (preset 423+248 lines) at which time gate 608 is inhibited and binary counter 609 is reset by transfer gates 607 to the number in storage 605 in the manner previously described.

With reference to FIGURE 8, the manner in which the horizon line and ground plane shading are generated is now set forth. It will be recalled that as the counter advanced to count 477, gate 619 operated to change the state of ground shading flip-flop 639, and as a result the output $\overline{T}$ of flip-flop 639 over conductor 641 becomes "1" for a first input circuit of AND gate 645. A second input circuit for AND gate 645 is connected to the horizontal sync conductor "$h$" of the timing generator 80 (FIGURE 2). With the receipt thereafter of each horizontal sync pulse "$h$" (which occurs at the start of each raster line) AND gate 645 opens to couple a signal over conductor 646 to binary counter 701.

Binary counter 701 comprises seven flip-flops connected so as to be capable of counting from zero to one hundred twenty-seven, and as each horizontal sync pulse is received, the binary counter 701 advances one count. See, for example, Pulse & Digital Circuit, Millman and Taub, McGraw-Hill, 1956, pages 323 and 324. The output of the binary counter 701 is connected to a digital to analog converter 703 which may comprise seven switches connected in a resistance-adding circuit, to provide a potential output which advances one increment as each successive count is received (as shown by the waveform A–D adjacent the output conductor 705). With reference to such waveform, the converter 703 provides zero output during the portions A, B, as a result of the binary counter being inoperative. As ground shading circuit 639 and AND circuit 465 operate (count 477 in the present example and point B on waveform A–D) to advance the binary counter to step 1, the potential output of converter 703 is increased one increment.

As the binary counter 609 advances to count 547, the preset gate 623 for the horizon line is opened to provide a pulse over conductors 625 and 626 to the ground shading circuit 639 to return the flip-flop circuit 639 to its original state. At such time, a reset pulse is transmitted over conductor 643 to binary counter 701, which resets and returns the output of the converter 703 to zero (waveform point D). The increasing signal represented by the sloping portion of the waveform B–C, is applied over conductor 705 to the video amplifier 124, whereby the portion of the raster 15 degrees below the horizon line becomes increasingly dark as successive lines below the horizon line are drawn (count 477–547) and at the time of occurrence of count 547 a line of demarcation as defined by the shift in level of waveforms A, B, C from maximum (black) at point C to a level producing no shading (point D) is traced across the display. By way of brief digression, the signal is shown as a positive-going waveform, in that all black video signals are generated as positive-going waveforms and then subsequently inverted before transmission to the video amplifier.

As the horizon line is being drawn (count 547), gate 623 (FIGURE 7) also couples a pulse over conductor 625 to open OR gate 647 which in turn operates flip-flop 649 to its second state, and its output circuit $\overline{X}$ becomes "1" for one input circuit of AND gate 655. The second input circuit of AND circuit 655 is connected to the horizontal sync "h" output of timer generator 80 (FIGURE 2).

With the receipt of the next horizontal sync pulse over conductor "h," AND gate 655 opens to initiate the operation of binary counter 657. Binary counter 657 comprises four flip-flops (range of count 0–15) having an eight-wire output connected to the inputs of two preset gates 663 and 667. Preset gate 663 is connected to operate with the advancement of binary counter 657 to count twelve ($L=1, M=1, \overline{N}=1, \overline{P}=1$) and gate 667 is connected to operate with the advancement of the binary counter 657 to count eight ($L=1, \overline{M}=1, \overline{N}=1, \overline{P}=1$). As the binary counter advances to count twelve, gate 663 couples an output pulse back over conductor 665 to flip-flop 649 to return the flip-flop to its normal state ($X=1$) to reset the binary counter 657.

During the generation of the horizon line, the binary counter 657 operates without effect. If, however, it were desired to produce a white line at the horizon, the operation of counter 657 and the addition of a preset gate similar to gates 663–667 would be used to determine the thickness of the white line. Further, in the event the raster is traced when the aircraft is in an attitude requiring the display of one of the pitch lines, such as −30, +30, 60, 90, etc., the binary counter 657 determines the width of the line to be generated. Such manner of operation is now set forth hereat.

Assuming that the attitude of the aircraft is such that the +90 degree pitch line is to be traced across the center of the display (i.e., a straight vertical climb condition of the aircraft) the ten bit word signal received by shift register 601 over the elevation angle input conductor SP5 (FIGURE 7) will set binary counter 609 to count 846, and as the count advances to count 970 (the center of the raster) during the raster trace the +90 degree line gate 635 will open ($A=B=C=D=\overline{E}=\overline{F}=G=\overline{H}=J=K=1$) to control OR gate 647 in the operation of the clock flip-flop 649 which in turn controls AND gate 655 in the operation of the binary counter 657 as each successive horizontal sync pulse is received over conductor "h" (i.e., one pulse each time a succeeding horizontal line of the raster is traced).

The ninety degree gate 635 is also operative to transmit a signal over conductor 638 to 90 degree flip-flop 671 (FIGURE 8) to change the state thereof, and thereby effect the transmission of a "pitch line" signal over conductor 673 to AND gate 675. The flip-flop 671 is maintaned in such condition until such time as the binary counter reaches count twelve, at which time gate 663 ($L=1, M=1, \overline{N}=1, \overline{P}=1$) returns the flip-flop 671 to its original state and the "pitch line" signal is removed from conductor 673. During such period (which comprises a period in which twelve horizontal lines are traced on the raster) the pitch line signal is continuously provided to AND gate 675.

Since the 90 degree pitch line is to be displayed as a broken or dashed line (rather than a solid line) extending horizontally across the display, binary counter 659 operates to provide pulses to the second input circuit for 90 degree pitch line AND circuit 675 at spaced intervals during each line trace. The input circuit for binary counter 659 is gated by each horizontal sync pulse of the timer generator 80. During each horizontal trace, binary counter 659 counts two hundred display clock (DC) pulses and advances in accordance therewith. Conductor 661 is connected to the $2^5$ stage on the counter, and accordingly provides an output pulse for the period during each count that the $2^5$ is energized. During each period that a pulse appears on conductor 661 during the trace of each of the twelve horizontal lines defined by reason of the ninety degree pitch gate 671 being open, AND gate 675 opens to extend a pulse over conductor 677 and OR gate 679 to the black video conductor 122 to provide a dashed line on the display. The dashed portions on the display in the present embodiment in which the conductor is connected to the $2^5$ stage are approximately one inch in length.

The thirty and the sixty degree pitch lines are solid lines differing in thickness, and accordingly the output of the sixty degree pitch line circuit 681, and the thirty degree pitch line circuit 687 are transmitted directly over conductors 683, 691 respectively, and over OR gate 679 to the black video generating circuit. Since the thickness of symbols produced by the sixty and ninety degree pitch line circuits 681, 671 are controlled by preset gate 663, the sixty degree pitch line and ninety degree pitch line are twelve lines wide on the raster. The thirty degree pitch line circuit 687 is controlled by preset gate 667 and accordingly provides a symbol eight lines wide on the raster.

FLIGHT PATH GENERATION

As noted above, the system further includes path generator means comprising flight path shape and position computer 174 and flight path horizontal positioner 182 which are operative to generate signals which result in a flight path display for use in the guidance of the pilot.

With reference to FIGURES 1A–1G the general nature of the information provided by the path is more clearly set forth thereat. The flight path basically comprises a white highway having a wider width near the lower marginal edge of the display, and an apex which is adjustable to different positions on the display. The margin of the highway is defined by a right hand black marginal line ($X_2$) and a left hand black marginal line ($X_3$), which lines are separated most widely at the lower marginal edge of the display and slope inwardly toward the apex point of the highway. A center line $X_1$ provides an indication of the heading to be followed. The display also includes a pair of vertical lines PP′ which comprise a reference marker and the center line $X_1$ will pass through such markers whenever the aircraft is at the correct lateral position. A pair of separated vertical lines provide altitude markers AL, AR for the aircraft, and when the aircraft is at the assigned altitude the marginal lines $X_2$, $X_3$ extend through the on-altitude markers AL, AR. As will be shown, "on-altitude" in the present embodiment is an altitude 100 feet above the path.

From the foregoing description it will be appreciated that the display of FIGURE 1A illustrates level flight and assigned altitude, the display of FIGURE 1B illustrates correct lateral position, on-altitude, but with a requirement for a turning maneuver, the display of FIGURE 1C indicates correct lateral position and above altitude, the display of FIGURE 1D indicates correct lateral position and below altitude, the display of FIGURE 1E indicates on-heading, on-altitude, but incorrect lateral position, the display of FIGURE 1F indicates a level flight condition, on-heading, on-altitude, and "pitch-up" command, and FIGURE 1G illustrates level flight, on-heading, on-altitude with a "pitch-down" command.

As noted above, the "on-altitude" condition of the aircraft refers to a position approximately 100 feet above the path. The condition shown in FIGURE 1C is the display provided with the aircraft 400 feet above the flight path, and the display of FIGURE 1D is provided with the aircraft approximately fifty feet above the flight path. The display of FIGURE 1B indicates a maneuver, which will vary the heading of the aircraft approximately 45 degrees, is now required.

The flight path shape and position computer 174 and flight path horizontal positioner 182 are operative to provide such displays responsive to the receipt of information from the computer 12. Preliminary to the description of the circuitry and its manner of operation, initial reference is made to the parameters of the flight path, and the flight path as mathematically defined. The following table illustrates the parameters in aircraft coordinates as based on circuitry in which a five megacycle clock oscillator is used to divide each horizontal line of the raster into 248 increments or $\frac{1}{32}''$ element. The numbers for the coordinates as set forth in the table are therefore in terms of a raster having $\frac{1}{32}''$ elements.

TABLE II $m = (-90) =$ constant (distance from display center to path hinge point)

$n =$ offset (lateral position error) $-75 < n < +75$ $\phi =$ heading error angle $c =$ coordinate transform constant for $x$, $c = 380$ $d =$ coordinate transform constant for $y$, $d = 124$ $k = -m - d = -34$ $g =$ apex vertical position $-45 < G < +45$ $r = 6400/h 50 < h < 400$ $h =$ altitude above path in feet where 100 ft. above = ON ALTITUDE $1/g - m =$ will be computer input describing apex vertical position Signals indicating variations in the foregoing parameters are readily obtained from conventional aircraft equipment including an altimeter 32 which couples indications of altitude over conductor 34 to computer 12 for comparison with command altitude and computation of $r$, a stable platform 20 which provides an indication of heading over conductor 22, an indication of roll attitude over conductor 24, and an indication of pitch attitude over conductor 26. The ground speed indicator 28 provides information over conductor 30 to computer 12 relative to the aircraft ground speed.

The inputs provided by computer 12 to the flight path shape and position computer 174 include the heading error angle ($\phi$) information over conductor 166 in the form of (tan $\phi$), the altitude information ($r$) over conductor 172, and apex vertical position $1/g - m$ over conductor 173. The lateral offset is provided over conductor 168 to flight path horizontal positioner 182.

As will become apparent during the following description of the flight path generator and positioner circuitry, the path may be defined in terms of X, Y coordinates, and the circuitry is operative to calculate the path, shape, and position by determining the value of X as a function of Y for each line of the raster trace. It will be recalled that the Y coordinate changes for each horizontal line of the raster. Thus, in the present disclosure, during the trace of the first raster line, the Y coordinate is 0, during the trace of the second raster line, the Y coordinate is 1, etc., until 262 lines have been traced (248 of which appear on the viewing portion of the display).

With reference to FIGURE 1A wherein the center line is defined as $X_1$, the right hand marginal line is $X_2$ and the left hand marginal edge is $X_3$, it will be apparent that the value of the center line $X_1$ will remain the same as the raster progresses ("on-heading" condition). However, since the value of "y" increases as the raster progresses from the bottom marginal edge towards the top the coordinates $X_2$, $X_3$ change as a function thereof. As will be shown, the values of X for any of the paths shown in FIGURES 1A–1G may be defined mathematically as a function of Y in the following manner:

$$X_1 = (y+k) \tan \phi + n + c$$

$$X_2 = [\overbrace{(y+k) \tan \phi + n + c}^{X_1}] + r\left(1 - \frac{y+k}{g-m}\right)$$

$$X_3 = [(y+k) \tan \phi + n + c] - r\left(1 - \frac{y+k}{g-m}\right)$$

(Subtract "$n$" from each expression if X counter is preset to $256 + n$.)

As will be shown in the following description, the changing parameters including offset, heading error, changes in pitch, changes of altitude, are included in such formulae, and the values of the X coordinates are changed to integrate such information into the path display.

In the present embodiment coordinate transformation is used for the purpose of providing positive value signals wherever possible to the computer equipment because of the known limitations of computer circuitry in working with negative values. By way of brief example, as the aircraft maneuvers to a below altitude position (see FIGURE 1D for example), the true marginal edges of the path would have minus values if the lower left hand corner of the viewed portion of the raster were identified by $X = 0$, $Y = 0$. Accordingly, the true lower left hand marginal edge of the raster is identified as $X = 256$, $Y = 0$.

The circuitry arrangement for effecting the novel generation of a path display is set forth in FIGURES 9–11 when arranged according to block illustration of FIGURE 12, and reference is made thereto for the purpose of illustrating the manner in which such equipment is operative.

COMPUTATION OF COORDINATE $X_1$ FOR CENTER LINE OF FLIGHT PATH

It is first recalled that the basic purpose of the flight path generator circuitry is to provide a value for the X path coordinates which is a function of the Y coordinate, the value of $X_1$, $X_2$, $X_3$ varying with the altitude and heading of the aircraft. In the display of FIGURE 1B, for example (on-altitude, on-course, lateral deviation—45 degrees), the Y coordinate for the first line of the raster trace is $y = 0$ and the X coordinates are $X_3 = 258$ (the left hand marginal edge of the path), $X_1 = 346$ (the center line of the path), $X_2 = 434$ (the right hand marginal edge of the path). At line 34 of the raster ($y = 34$), the coordinates are $X_3 = 316$, $X_1 = 380$, $X_2 = 444$.

The manner in which the flight path circuitry computes such values and positions the path in such manner is now set forth. With reference to the circuitry (FIGURE 9) binary counter 727 comprises an eight bit counter of the type noted hereinbefore. The counter is reset with the receipt of each vertical sync pulse "$v$" at the end of each raster trace. During each raster trace the counter 727 counts the raster lines, as generated, to thereby continually provide the value of the "$y$" coordinate to the flight path computer. An AND gate 725 which is controlled by the inverted vertical sync pulse ($\bar{v}$) gates the horizontal sync pulses (FIGURE 2) of the timing generator 80 to the counter over conductor 726 to advance the counter one step as each raster line is traced.

The horizontal line ("$y$") being generated at any time during the raster trace is identified by the output of the counter 727 which is fed into a computer arrangement for the purpose of determining the absolute value of $y + k$. That is, the coordinates of $X_1$, $X_2$, $X_3$, as indicated in the degrees, and the marginal lines $X_2$, $X_3$ will yet be identified by positive values in the trace of the first raster line.

The count value of 380 is added to the absolute value of the product of $(y+k)$ $(\tan \phi)$ by feeding the product output of multiplier 757 to one input of adder circuit 765, and to one input of subtractor circuit 767, and by feeding the count 380 (conductor 763) to the second input of adder circuit 765 and the second input of subtractor circuit 767. Subtractor 767 may be similar in structure to subtractors 731, 733, and adder 765 may be of the structure set forth in the aforementioned references.

In the specific example in which the initial line trace of FIGURE 1B is being considered, $y=0$, and since the heading error was indicated as 45 degrees, the value of tangent $\phi=1$. The absolute value of the product of $(y+k)$ $(\tan \phi)=(0+34)(1)$ and the absolute value which appears on conductor 761 is 34.

With the coupling of count 380 to adder 765, the output of adder 765 which appears on conductor 769 will be $(380+34)=414$. The output of subtractor 767 which is coupled over conductor 773 will be $(380-34)=346$. The absolute value output of adder 765 is coupled to one input of AND gate 771 and the output of subtractor 767 is coupled to one input of AND gate 775. The computer now selects the one of the absolute values thus provided by reference to the sign of the product $(y+k)(\tan \phi)$ which appears on conductor 801, and which was derived in the manner explained heretofore.

That is, it will be recalled that the sign of the product of $(y+k)(\tan \phi)$ was coupled to the second input of AND circuit 771 and over inverter 803 and conductor 805 to the second circuit of AND gate 775. In the present example, the sign of the product is negative and "0" is extended over conductor 801 to gate 771. Accordingly AND gate 771 will remain closed. However, "0" is also applied to inverter 803 and "1" appears on conductor 805 to open AND gate 775 and thereby couple the absolute value output of subtractor 767 (346 in the present example) over conductor 779 to OR gate 781. As indicated by the legend adjacent output conductor 782 of OR gate 781 the count appearing thereat is the absolute value of $X_1$.

With reference to FIGURE 1B, the absolute value of the $X_1$ coordinate (346) is plotted on the first raster line trace. As a second example of the manner in which the value of X changes as a function of Y during the raster trace from the bottom marginal edge toward the upper marginal edge, it is now assumed that the raster has advanced to the raster line 34 (the hinge point in the present embodiment). With reference once more to FIGURE 9, it will be apparent that the output of counter 727 as the raster advances to such line will be 34. The counter output $(y=34)$ is extended over conductor 729 to subtractor 731 and to subtractor 733. Since the value $k=34$ is being coupled to the second input circuit of both the subtractors 731 and 733, each subtractor will have a zero output, and AND gates 745, 747 and OR gates 753 remain closed so that the input to the simultaneous multiplier 757 is zero. Accordingly, the output of simultaneous multiplier 757 which appears over conductor 761 will be zero, and the output of the adder 765 and subtractor 767 will be 380. No borrow will be generated in subtractor 731 or 733. Hence the signals on conductors 738, 742 will be zero, and the resulting output of OR gate 799 will be zero. Therefore, AND gate 771 will be disabled, but AND gate 775 will be enabled by the "1" output of inverter 803. The output of AND gate 775 will be coupled over conductors 779 to OR gate 781 and will be 380 (the value of the constant which is coupled over conductor 763 to adder 765 and subtractor 767). Signal "0" appears on conductor 801 in that conductors 738 and 742 are both "0," i.e., neither subtractor 731 or 733 had an ultimate borrow. With signal "0" on conductor 801, gate 775 operates. The absolute value of $X_1$ which appears on conductor 782 during the trace of line 34 will be 380. The location of such coordinate is shown in FIGURE 1B, and as there shown the center line $X_1$ extends through such point when the heading error is plus 45°.

The apex of the path in the illustration of FIGURE 1B terminates at the horizon line $(y=124)$. It will be apparent from the foregoing description that the output of subtractor 731 in such event $(34-124)$ will be useless, and the output of subtractor 733 will be $(124-30)=90$. The ultimate borrow conductor 738 will be "1" and the ultimate borrow conductor 742 will be "0." The sign of the product $(y+k)(\tan \phi)$ which appears on conductor 801 will be "1." ($\phi=+45°$ in the present example).

The value 90 is gated over AND gate 747 and OR gate 753 to multiplier 757. Since the heading error is 45 degrees, the value of $\tan \phi$ is one and the product of $(\tan \phi)(y+k)=90$.

The values 90 and 380 are now supplied to adder 765 and subtractor 767, and the outputs are 470 and 290 respectively. However, since the sign on conductor 801 is "1," the AND gate 771 extends the output of adder 765 (which is 470) over conductor 777 to the OR gate 781 and the $|X_1|$ output conductor 782. The coordinate value 470 for $X_1$ on line 124 is illustrated in FIGURE 1B. The manner in which the other coordinates of center line $X_1$ of the path are calculated for changing values of $y$ as the raster progresses will be apparent from such examples.

It will be further apparent that the most basic expression of the line $X_1$ (i.e., in the display in which coordinate transmformations are not used) will be $X_1=(y)(\tan \phi)$.

COMPUTATION OF $X_2$, $X_3$ COORDINATES FOR RIGHT AND LEFT MARGINAL LINES OF FLIGHT PATH

The novel circuitry is operative to compute the flight path outline by using the values of $X_1$ as determined for each line trace to determine the values of the line coordinates $X_2$ and $X_3$. A description of such circuitry is provided hereat prior to the disclosure of the circuitry which uses such information to provide the raster trace of FIGURE 1B.

It is once more noted that the coordinates $X_2$ for the right marginal line of the path are determined by $$X_1 + r\left(1 - \frac{y+k}{g-m}\right)$$

and the coordinates for the left hand marginal line of the path are determined by $$X_1 - r\left(1 - \frac{y+k}{g-m}\right)$$

Since $X_1$ and $y+k$ are determined by the circuitry of FIGURE 9, such results may be used in determining $X_2$ and $X_3$.

The circuitry for providing such coordinates is basically shown in FIGURE 10. With reference to FIGURES 9 and 10, it will be apparent that the absolute value of $(y+k)$ as provided on conductor 755 by OR gates 753 is also extended over conductor 759 to the input of a simultaneous multiplier 815. The second input of simultaneous multiplier 815 is connected over conductor 173 to computer 12 (FIGURE 3) which couples the value of $1/g-m$ which varies from $\frac{1}{45}$ to $\frac{1}{135}$ in the present embodiment. As noted heretofore, such counts represent the relative displacement of the apex of the path along the vertical as different changes of command are provided on the display (see FIGURES 1F, 1G for example). The simultaneous multiplier may be similar in structure to simultaneous multiplier 757. As will become more apparent the slope of the flight path marginal edges $X_2$ and $X_3$ may be varied at the hinge point (or any other point desired) by variation of the value of $1/g-m$ at the desired point of slope change.

The output of simultaneous multiplier 815 is the product of $(y+k)$ $(1/g-m)$ and the absolute value of such product is transferred over conductor 817 to the formulae, are determined in part by the absolute value of $(y+k.)$ The parameter $k$ is defined as $-m-d$ in which "$m$" is the distance from the display center (raster line 124) down to the hinge point (raster line 34), which distance is $-90$ and $d$ is the coordinate transformation for $y$ and equals 124. In the present example, therefore, $k = -(-90) - 124 = -34$.

The circuitry for determining the value of $y+k$ is shown in FIGURE 9 and basically includes counter 727, "$k$" input circuit 734, subtractor circuits 731, 733, AND gates 745, 747, and OR gate 753. The subtractor circuits may be of the type shown in Arithmetic Operation in Digital Computers, R. R. Richards, 1955, Van Nostrand. As is well known, computers have difficulty in adding negative numbers, and it is necessary therefore to determine separately the absolute value of $k-y$ and $y-k$, and separately ascertain the proper sign of the two numbers. The sign of the resultant number is fed into a set of AND gates 795, 797, and combined with the sign of tangent $\phi$ as will be shown in more detail hereinafter.

Referring back to the circuitry which is connected to provide the absolute value of $y+k$, it will be apparent that the constant $k$ ($-34$ in the present example in which the hinge point is to be located as illustrated in FIGURE 1B), is fed into one input circuit of the subtractor 731 ($k-y$), and into one input circuit for the subtractor 733 ($y-k$). The second input of the subtractors 731 and 733 is connected to the output of the counter 727, whereby the changing value of $y$ (0–248) as the raster progresses is constantly fed to the subtractors 731 and 733.

The output of subtractor 731 which is $34-y$ will be usable whenever $y$ lies between zero and thirty-four, and such value will be coupled over conductor 739 to AND gate 745. The output of subtractor 733 which is $y-34$ will be usable whenever $y$ is a number between 34 and 248, and such value is coupled over conductor 743 to AND gate 747.

As a specific example, it will be apparent that during the first line trace $y=0$, the absolute value provided by subtractor 731 will be $34-0=34$. The output of subtractor 733 which attempts to subtract 34 from zero will be a useless number. The ultimate borrow output conductor 741 will be "1," therefore, and as a result the second input to AND gate 745 will be enabled to gate the absolute value of subtractor 731 to the OR gates 753. The ultimate borrow signal of subtractor 731 will be "0" and the AND gate 747 will be blocked by such signal to prevent the gating of the output of subtractor 733 to the OR gate 753.

The ultimate borrow output "1" of subtractor 733 is coupled to AND gate 797 and the ultimate borrow output "0" of subtractor 731 is coupled over conductor 738 to one input circuit of AND gate 795, the gates 795, 797 being operative to provide the sign of the product $(y+k)$ (tan $\phi$) as shown hereinafter.

Summarily, at this time the subtractors have determined the usable absolute value of "$y+k$" and such value has been coupled over AND gate 745, and OR gate 753 to the input conductor 755 for simultaneous multiplier 757 (FIGURE 9) and over conductor 759 to simultaneous multiplier 815. Further, the sign of $y+k$ has been extended to the gtaes 795, 799.

The simultaneous multiplier 757 may be of the type shown in Arithmetic Operation in Digital Computers, R. R. Richards, 1955, Van Nostrand, and now operates to provide the product of the absolute value of $y+k$ and tan $\phi$, it being recalled that the value of $\phi$ varies with the heading error of the aircraft. The manner in which tangent $\phi$ is provided to the simultaneous multiplier 757 is now set forth.

The value of the heading error (45 degrees to the right in the example shown in FIGURE 1B) is continually computed by computer 12 which in turn provides a signal indicating the value of tangent $\phi$ over conductor 166 to the flight path computer 174. Specifically, such signal is provided over conductor 166 (FIGURE 9) to a set of storage circuits including shift register 783, transfer gate 785 and storage gate 787, which are similar to the circuits used in the symbol positioning circuits shown in FIGURES 2, 4 and 5. The incoming signal is a seven bit signal in which six bits represent the tangent of $\phi$ in absolute terms, and one bit represents the sign of the tangent $\phi$. The seven bit signal is registered in shift register 783, and when a complete word has been received, transfer gates 785 effect transfer of the information to the seven bit storage circuit 787. As shown by the legends adjacent the output circuit 791 of storage circuit 787, in the event the sign of tangent $\phi$ is plus, "1" is coupled to conductor 791, and in the event the sign of tangent $\phi$ is minus, "0" is coupled to conductor 791 whereby the sign of tangent $\phi$ is provided to AND gate 795. The complement of sign of tangent $\phi$ or $\overline{\text{sign tan}}\ \phi$, is coupled over conductor 793 to one input circuit of AND gate 797. That is to say, if tan $\phi$ is negative, a "one" is coupled over conductor 793 to AND gate 797. If positive, a "zero" is coupled over conductor 793 to AND gate 797.

It will be recalled that AND gates 795 and 797 determine the sign of the product of $y+k$ and tangent $\phi$. With reference once more to subtractors 731 and 733, it will be recalled that the conductor 737 will be bit zero in the event no borrow is required in subtractor 731, and the output of subtractor 733 on conductor 741 will be bit "1" if a borrow is required in subtractor 733. In the present example (first line of the raster shown in FIGURE 1B), $y=0$ and $|K-y|=34$; there is no borrow by subtractor 731, and there is a borrow by subcontractor 733. Accordingly, "0" appears on conductor 738 and "1" appears on conductor 742. Since the heading error shown in FIGURE 1B is plus 45 degrees (the path moves to the right for positive values and to the left for negative values), "1" will appear on conductor 791 and "0" will appear on conductor 793.

As a result, the output of both AND gates 795 and 797 will be zero, the input to OR gate 799 is zero and the OR gate 799 will couple "0" to the AND gate 771 and to the inverter 803 connected in the input circuit to AND gate 775. If the heading error had been to the left the signal on conductor 791 would be "0" and the signal on conductor 793 would be "1." In such event, the output of AND gate 797 would be "1" and the sign of the product would have been identified to AND gate 771 and inverter 803 as "1." If the signals on the ultimate borrow conductors 738, 742 were reversed by reason of the raster being advanced past line 34 ($y \geq 34$), the sign (output of OR gate 799) for a right hand error would be "1" and the sign for a left hand error would be "0." Thus, it is apparent that the correct sign of the product of $(y+k)$ (tan $\phi$) is always gated to the circuitry 771, 775 which is also receiving the absolute value of the product of $(y+k)$ (tan $\phi$) over conductors 769, 773 as now described.

With reference once more to the output of simultaneous multiplier 757, the multiplier output (the absolute value of the product) $(y+k)$ (tan $\phi$) is combined with the coordinate transform constant, which in the present embodiment is 380. As indicated heretofore, the circuitry of the computer is considerably simplified if a minimum of negative numbers is utilized in the calculation. Further, the comparators for horizontal positioning in the disclosed embodiment are adapted to receive positive values. The addition of the count 380 to the product $(y+k)$ (tan $\phi$) results in the vertical center line of the raster being referenced by count 380. As shown in FIGURE 1B the count of each horizontal line is initiated at count 256, and as a result the center line occurs at count 380, and the line trace is completed at count 504. As a result of using such method of coordinate transformation, the flight path apex angle may be increased to 140 input of adder 819 and the input of subtractor 821. In accordance with the formulae defining coordinates $X_2$ and $X_3$, the absolute value 1 is provided over a second input circuit for adder 819 and a second input circuit for subtractor 821. The output of adder 819 will be $$1 + \left|\frac{y+k}{g-m}\right|$$

and the output of subtractor 821 will be $$1 - \left|\frac{y+k}{g-m}\right|$$

Adder circuit 819 and subtractor circuit 821 may be similar to circuits 765, 767, respectively.

The output of adder 819 is connected to one input circuit of AND gate 823 and the output circuit of subtractor 821 is connected to one input circuit of AND gate 825. The second input circuits of AND gates 823, 825 are connected over conductors 744, 736 respectively to the ultimate borrow conductors for $y+k$ circuits 731, 733 for the purpose of determining the one of the AND gates which has the correct value for such coordinates.

It will be recalled that in the present example on line $y=0$ the sign $(y+k)$ was negative, and as a result "1" appeared on conductor 744. Accordingly, $$\frac{y+k}{g-m}$$

is negative and appears at the input circuit of AND gate 823, and the sum of $$1 + \frac{y+k}{g-m}$$

is extended over OR gate 827 and conductor 828 to the simultaneous multiplier 829. It will be recalled that as the first raster line is traced, the absolute value of $y+k$ in the present embodiment and at $y=0$ is 34. Since the apex is at the horizon, the value of "$g$" is zero. The value of "$m$" is $-90$. The absolute value coupled over conductor 828 is therefore $$1 + \frac{y+k}{g-m} = 1 + \frac{34}{-(-90)} = 1.38$$

Such value will, of course, change as the position of the apex of the flight path is altered to indicate pitch up or pitch down condition.

It is once more noted that the width of the path changes as the altitude of the aircraft varies above and below the on-path course (see for example FIGURES 1C and 1D). Accordingly, if the width of the path changes, the coordinates $X_2$, $X_3$ of the marginal lines of the flight path will vary, and it is necessary to provide a function of altitude in the calculations of the $X_2$, $X_3$ coordinates for each raster trace.

As shown in FIGURE 3, indications of the aircraft altitude are provided by sensor 32 over conductor 34 to computer 12, which in turn provides a bit signal over conductor 172 (FIGURE 3) to the flight path circuitry 174 which indicates the deviation of the aircraft from its height of the path. In the illustrated embodiment, the path is adjustable to show variation of the aircraft from $h=400'$ to $h=50'$ above the path.

With reference to FIGURE 9, the input indicating altitude deviation is coupled over conductor 172 to the storage equipment including shift register 807, transfer gates 809 and storage circuitry 811, which circuits are similar to the circuits used in the symbol positioning circuitry described in FIGURES 2 and 4 and are operated in a similar manner.

The altitude representative signals are stored in shift register 807, and when a complete word is stored, a word space pulse received from the computer controls transfer gate 809 to transfer the information to storage circuit 811 for coupling over conductor 813 to a second input circuit of the simultaneous multiplier 829. It is apparent therefrom that the output of simultaneous multiplier 829 will be the product of $$(r)\left(1 + \frac{y+k}{g-m}\right)$$

in the present example. Simultaneous multiplier 829 may be similar in structure to simultaneous multiplier 757.

Referring once more to the bottom line of the raster being traced, and assuming that the aircraft is on its assigned altitude (which is 100 feet above the flight path), and assuming that the aircraft is on course, the absolute value of the signal coupled over conductor 813 will be $$r = \frac{6400}{100} = 64$$

The product of $$(r)\left(1 + \frac{y+k}{g-m}\right)$$

as determined by simultaneous multiplier 829 will be $(64) \times (1.38) = 88.3$. Such value must now be added to the value of $X_1$ to obtain $X_2$, and subtracted from $X_1$ to obtain the value of $X_3$. More specifically, the absolute value of 88 is coupled over conductor 831 to one input circuit of adder circuit 833, and over conductor 831 to one input circuit of subtractor 835. The value of coordinate $X_1$ for the same line (determined in the manner previously described by the circuitry in FIGURE 9) is connected over conductor 782 to the adder 833 and subtractor 835, which may be similar in structure to adder 765 and subtractor 767.

As a result, the adder circuit 833 adds the value of the $X_1$ coordinate (346 for the first raster line) to the absolute value $$r\left(1 - \frac{y+k}{g-m}\right)$$

(88 for the on-altitude condition) and the absolute value of 434 is coupled over conductor 837 to comparator 188 (FIGURE 11) for the $X_2$ coordinate on the first line trace.

Simultaneously, the subtractor 835 subtracts $$r\left(1 - \frac{y+k}{g-m}\right)$$

from $X_1$, which in the present example is $$(346) - (88) = 258$$

The absolute value output of subtractor 835 is coupled over conductor 839 to the comparator 194 which provides the coordinates for line $X_3$ (the left hand line in each raster trace). With reference to FIGURE 1B it will be apparent that the $X_2$ coordinate for the right hand marginal line of the path during the first raster line is 434 and for the left hand marginal edge is 258.

From the foregoing description, it will be apparent that at the start of each line trace, the flight path computer circuitry 174 computes the value of $X_1$, $X_2$, $X_3$ for the line trace as a function of "$y$" (the specific line being traced) and such information is stored and applied to the comparators 186, 188 and 194 respectively. It will be apparent that the computations may be made one line in advance of the trace and stored in appropriate storage means if additional computing time is desired.

The comparators 186, 188, 194 are operative as each horizontal line is traced to effect the coupling of an output signal over the corresponding conductor $TX_1$, $TX_2$, $TX_3$ to the black video conductor 122 and over amplifier 124 to the display tube 18 to effect the display of the path in a manner set forth in detail hereinafter.

With reference to FIGURE 11, it will be apparent that the symbol positioning equipment 182 for the flight path includes means for incorporating adjustment of the path from the center "on path" marker whenever the aircraft is displaced laterally from the desired path. Lateral offset information is coupled over conductor 168 to shift register 841 by the computer 12. As noted heretofore, the offset coordinate is determined by the formula $N+256$ whereby in the absence of offset $N=0$, the first X coordinate of each line is 256. The manner in which offset is included in the values of $X_1$, $X_2$ and $X_3$ to provide an offset path, such as shown in FIGURE 1E, for example, is now set forth.

As shown in FIGURE 11 the offset circuitry includes a shift register 841 for receiving the offset information "$n$," transfer gate 843, storage circuit 845 and preset gates 847. It will be recalled that with the initiation of each horizontal line trace, a horizontal sync pulse "$h$" is applied to the circuitry of FIGURES 9 and 10 to operate same in the calculation of the $X_1$, $X_2$, $X_3$ coordinates for such line. The horizontal sync pulse "$h$" is also applied to preset gates 847 to effect the transfer of the count therein to counter 849 so that as the counter operates responsive to the display clock pulses coupled thereto immediately after the termination of the horizontal sync pulse (gate 850 as gated by $\bar{h}$ pulses or inverted horizontal sync pulses), the counter 849 will start counting from $256+N$, and will advance 248 counts during the horizontal line trace.

The output of counter 849 is coupled simultaneously to comparators 186, 188 and 194, and as the count advances to the coordinates $X_1$, $X_2$, $X_3$ applied at the inputs of the respective comparators, the comparators will provide signals over conductors 187, 190 and 196 respectively to effect a display on corresponding elements of the raster. Thus, in the trace of the first line ($y=0$) (assuming no offset error), as the count on counter 849 advances to 258, comparator 194 transmits a video pulse over conductor 196 to conductor 122; as the count advances to 346, comparator 186 couples a pulse over conductor 187 to conductor 122; and as the count advances to 434, comparator 188 couples a pulse over conductor 190 to video conductor 122.

As the first horizontal line trace is completed, the value of $y$ is changed to $y=1$ in the counter 727 (FIGURE 9) and the resulting values of $X_1$, $X_2$, $X_3$ are supplied to comparators 186, 188, 194 for use in providing the coordinates thereof for the second horizontal line trace.

It is apparent from the foregoing description that the computer circuitry continuously provides the values of the X coordinates for the horizontal lines as traced to thereby effect the display of the path including integrated information relating to altitude, offset, heading error and variable apex points.

Although not described in detail, it is apparent from the foregoing description that the input value of $1/g-m$ which is applied by the computer over conductor 173 may be changed as the path is being traced to provide an apex point different than the apex point for the portion of the path previously traced. Thus, if the apex point is changed as the raster reaches the line including the hinge point (line 34 in the present illustration), a "pull-up" command will result in which the outline of the path changes in slope at the hinge point.

It is also apparent that the formula for the lines $X_2$ and $X_3$ will differ if certain of the "variables" are not required, and coordinate transformation is not used. Thus, without coordinate transformation the formula for $X_2$ would be $$(y)(\tan \phi) + (r)\left(1 - \frac{y}{g-m}\right)$$

If variation of the width of the path with altitude is not required, the term "$r$" may be replaced by a constant "$N$" which provides a path of a desired fixed width. If the vertex position is to be maintained fixed, the term $g-m$ may be a constant and if lateral movement of the path is not desired, the term "$n$" may be omitted. These and other variations of the display will be apparent to parties skilled in the art.

AN-ALTITUDE AND ON-PATH MARKERS

As noted heretofore, the display provides "on-path" reference marks and "on-altitude" reference marks which are utilized to assist the pilot in determining variation of the aircraft from the programmed path. The "on-altitude" lines, as shown in FIGURES 1A–1G, comprise two vertical lines AL, AR located at the lower left and lower right hand portions of the display. Whenever the marginal edges of the path ($X_2$, $X_3$) pass through the vertical on-altitude markers, the pilot is assured that the aircraft is the proper distance above the flight path ($h=100'$ in the present example). The display effected with variation of the aircraft from the flight path is shown in FIGURES 1C and 1D, for example.

The circuitry for generating the on-altitude marks is shown in FIGURE 11. With reference thereto, the on-altitude circuitry comprises flip-flop circuit 879 which is connected to a preset gate on a raster line counter, such as counter 727 (FIGURE 9) which provides a pulse at count 32 to change the state of flip-flop 879. The second input circuit of flip-flop 879 is connected to a preset gate which provides a pulse at count 44 to return the flip-flop 879 to its original state. The output pulse of flip-flop 879 ("1" from count 32 to 44) is transmitted over conductor 881 to one input circuit of left hand mark AND gate 859 and to one input circuit of right hand mark AND circuit 877.

The second input to the left hand and right hand mark circuits 859, 877 is controlled by the preset gates 853, 855 which are connected over conductor 851 to the output of counter 849 which counts the segments in each horizontal line trace. As the counter advances to count 316 during each line trace, gate 853 gates a pulse over conductor 857 to left hand mark gate 859. During pulse count 316 in each count for lines 32–44 of the raster, output gates 859 open to couple a video pulse over conductor 871 and OR gate 873 to video conductor 122 to thereby provide the left hand mark AL on the display.

In a similar manner AND gate 855 is preset to operate at count 444 as the counter 849 transmits the count sequence over conductor 851 thereto during each horizontal line trace at such time gate 855 opens to transmit a pulse over conductor 875 to one input of right-hand mark AND gate 877. In that the second input circuit of gate 877 is connected to flip-flop 879, which output is "one" during lines 32–44 of the raster trace, a video signal will appear at the output conductor 883 of gate 877 at count 444 in each of the horizontal line traces 32–44 of the raster.

The output signals of left hand mark AND gate 859 and right hand mark AND gate 877 are coupled over conductors 871, 883 to on-altitude OR gate 873 and over conductor 900 to black video conductor 122, video amplifier 124, and the gun 126 of the display unit 18.

Since the on-altitude preset gates are tied to the counter 849 which has a first count which differs with variation in offset "$n$" of the aircraft from the path, it is apparent that the on-altitude markers AL, AR will shift laterally with the path as shown in FIGURE 1E, whereby an on-altitude condition is readily recognized even with the aircraft offset from the path.

ON-PATH MARKER CIRCUITRY

The novel circuitry also provides a marker on the display which indicates the lateral position of the aircraft. As shown in FIGURES 1A–1G, the marker comprises a pair of vertical markers located in the center of the display. Whenever the center line of the path extends through the on-path markers (FIGURES 1A–1D, 1F, 1G, for example) the aircraft is on the correct lateral position defined by the path. If the aircraft deviates from the path, the center line will be moved laterally from the marker. As shown in FIGURE 1E, the aircraft is to the right of the path. The circuitry for providing such markings will now be set forth.

Flip-flop circuit 879 (FIGURE 11) which is used for the on-altitude circuitry, and connected to operate during the trace of raster lines 32–44, is also operative during such count to transmit a pulse over conductor 881 to one input circuit of the on-path marker AND gate 885. The second input path for on-path marker gate 885 is controlled by on-path circuitry including a flip-flop circuit 887 for generating the left-hand on-path mark, and flip-flop circuit 897 for generating the right and on-path mark. Flip-flop circuit 887 is operated to a first condition by associated preset gate means (not shown) responsive to the occurrence of count 120 on each horizontal line, and is returned to its normal condition by further preset gate means (not shown) responsive to the occurrence of count 122, which horizontal count may be derived from a counter, such as 92 (FIGURE 2) which does not have coordinate transformations coupled thereto.

During the period of count 120–122 in each horizontal line trace, signal "1" is coupled over conductor 889 to OR gate 891 and conductor 901 to the on-path marker gate 885. AND gate 885 will open therefore during the counts 120–122 of horizontal lines 32–44 to couple a video signal over conductor 902 to provide the left hand on-path marker in the display device 18.

In a similar manner, the second flip-flop 897 generates the right hand on-path marker, and is connected to a counter, such as 92 (FIGURE 2) to operate responsive to occurrence of the count 126 in each horizontal line trace, and to return to its original state responsive to occurrence of count 128. During the period of counts 126–128 in each horizontal trace, signal 1 is coupled over conductor 899 and OR gate 891, and conductor 901 to AND gate 885. As a result AND gate 885 opens during counts 126–128 of lines 32–44 to couple a signal over the on-path conductor 902, and over video conductor 122 to the display device 18 to effect the display of the right hand on-path line.

The manner in which the ground texture circuitry 214 generates ground texture symbols (not shown) will be apparent from the foregoing disclosure. Further, the manner in which the speed markers which consist of rectangular blocks spaced along the marginal edge of the flight path are generated will be apparent from the description of the generation of rectangle symbols, which has been set forth herein (FIGURES 4, 5, etc.).

CONCLUSION

There has been set forth hereinbefore a novel electronic system which utilizes sensor inputs to control a computer device to provide signals representative of the Cartesian coordinates of a set of symbols including a flight path for display on associated display means. It is obvious, of course, that the system is operative with digital inputs other than the computer inputs including the direct application of digital signals to the input conductors, such as SP1, SH1, WSP1, etc., to provide these and other forms of symbols. The nature of the equipment for effecting the generation of the different symbol forms will be apparent further from the foregoing disclosure.

Tarstrip spacing can be provided on the path, for example, by providing an indication of the flight path width (which decreases with vertical trace in the present disclosure in which the raster is traced from the bottom marginal edge toward the top) and presetting a counter with a number corresponding to the complement of the path width number. As the preset number becomes larger (path width decreasing), the counter output will decrease and the distance to the next tarstrip up the path will be decreased to provide a perspective type display.

Such arrangement may also be used for cloud and ground texture perspective vertically. In such cases, an artificial path (never displayed) may be generated for reference purposes.

The generation of Command Heading Lines indicating fine heading errors, displayed with and rotating about the apex of the path may be effected by techniques similar to that used in the provision of the flight path.

Although the arrangement set forth herein has been disclosed as having particular utility in aircraft, it will be readily apparent that the device has similar application in submarines, ships, missile and torpedo guidance, simulator units, automobiles, tanks, and other types of mobile equipment in which the provision of the display of information relating to changing conditions is desired.

While what is described is regarded to be a preferred embodiment of the invention, it will be apparent that variations, rearrangements, modifications and changes may be made therein without departing from the scope of the present invention as defined by the appended claims.

What is claimed is:

1. In a visual cue display system for displaying information relative to a moving object, display means including a display target having a plurality of positions, each of which is identified by a different X and Y coordinate, digital source means for providing digital signals representative of the X, Y coordinates of at least one point on the display at which the information is to be displayed, each digital signal consisting of a word having a plurality of bits, position selection means connected to said display means for selectively energizing the different ones of said positions on said display target, video generator means for providing signals to control said display means to display a predetermined cue on said display target, and symbol positioner means connected to said digital source means operative to energize said video generator means with energization by said position selection means of the position on said display means having the X, Y coordinates represented by said digital signals provided by said source means.

2. In a visual cue display system for displaying information relative to a moving object, display means including a display target having a plurality of positions, each of which is identified by a different X and Y coordinate, digital source means for providing digital signals comprised of a plurality of bits representative of at least the coordinate of at least one position on the display at which the information is to be displayed, position selection means connected to said display means for selectively energizing different ones of said positions on said display device, indicator means connected to said position selection means including indicator means for providing indicator signals comprised of a plurality of bits indicating at least the coordinate of the energized position, video generator means connected to said display means for providing a predetermined symbol on the display area, and symbol positioner means for controlling operation of said video generator means operative responsive to the receipt of signals from said digital source means and said indicator means which indicate energization of the position having at least one of the coordinates represented by the plurality of bits of the indicator signals and the plurality of bits of said digital signals.

3. In a visual cue display system as set forth in claim 2 in which said symbol positioner means comprises a first circuit means including a shift register means comprised of a plurality of flip-flop circuits, each of which is connected to said digital source to store a different bit of the digital signals received from said source, storage means for storing said bit information comprising a plurality of flip-flop circuits corresponding in number to the flip-flop circuits in said shift register means, transfer means for transferring said bit information from said flip-flop circuits in said shift register to said flip-flop circuits in said storage means, and signal means for controlling said transfer means to transfer the information from said flip-flop circuits in said shift register to said flip-flop circuits in said storage circuit responsive to complete storage of a word on said shift register circuit.

4. A visual cue display system as set forth in claim 2 in which said symbol positioner means includes comparator means for detecting correspondence of the X coordinate represented by the plurality of bits of said indicator signal and the plurality of bits of said digital signal comprising a plurality of comparison circuits, each of which comparison circuits is connected to provide a signal indicating correspondence between a predetermined bit in the signals provided by said indicator means and the corresponding bit of a signal provided by said digital source, means connected to extend the correspondence signal of each comparison circuit to a subsequent comparison circuit in the series only responsive to correspondence of its associated bit in the indicator and digital signals, and means for providing an output correspondence signal from said comparator means to said video generator means only responsive to the provision of a correspondence signal by each comparison circuit to each succeeding comparison circuit in the series.

5. In a visual cue display system for displaying information relative to a moving object, display means including a display target having a plurality of positions, each of which is identified by a different X and Y coordinate, digital source means for providing digital signals comprised of a plurality of bits representative of at least the X coordinate for at least one position on the display at which the information is to be displayed, position selection means connected to said display means for selectively energizing different ones of the positions, indicator means connected to said position selector means for providing position signals representing at least the X coordinate of the energized one of the positions, video generator means connected to said display means for providing a predetermined symbol on the display area, and symbol positioner means for enabling said video generator means to provide the symbol at a desired position on the display means including at least a horizontal positioner circuit having comparator means, a first means connected between said comparator means and said indicator means for changing said position signals to words having a plurality of bits which identify the X coordinate, a second means connecting said comparator means to said digital source means, and means in said comparator means for providing an energizing signal to said video generator means responsive to correspondence between the plurality of bits of the X coordinate represented by said digital signal and the plurality of bits of said position signal.

6. In a visual cue display system for displaying information relative to a moving object, display means including a display target having a plurality of positions, each of which is identified by a different X and Y coordinate, digital source means for providing digital signals comprised of a plurality of bits representative of the X, Y coordinates of at least one position on the display at which the information is to be displayed, position selection means connected to said display means for selectively energizing the different ones of the positions, indicator means connected to said position selection means for providing indicator signals representing at least the X, Y coordinates of the energized one of the positions, video generator means connected to said display means for providing a predetermined symbol on the display area, and symbol positioner means for operating said video generator means to provide the symbol at a desired position, means for changing said indicator signals into words, each of which is comprised of a plurality of bits which identify the corresponding coordinate including at least a horizontal positioner circuit for providing a correspondence signal to said video generator means responsive to correspondence between the X coordinate represented by the plurality of bits of said digital signal and said indicator signal for the X coordinate, a vertical positioner circuit for providing a correspondence signal to said video generator means responsive to correspondence between the Y coordinate represented by the plurality of bits of said digital signal and said indicator signal for the Y coordinate, and means in said video generator circuit operative to provide said symbol on said display means only responsive to receipt of a correspondence signal from said horizontal and vertical positioner circuits.

7. In a visual cue display system for displaying information relative to a moving object, display means including a display target having a plurality of positions, each of which is identified by a different X and Y coordinate, digital source means for providing digital signals comprising a plurality of bits representative of the X, Y coordinates of at least one position on the display at which the information is to be displayed, position selection means including scanning means connected to said display means for effecting scanning of the different ones of the positions in a raster pattern, indicator means connected to said position selection means for continually providing word signals comprised of a plurality of bits indicating the X, Y coordinates of the position being scanned, video generator means connected to said display means for providing a predetermined symbol on the display area, and symbol positioner means connected to said indicator means for operating said video generator means to provide the symbol at a desired position including means responsive to receipt of a plurality of bits indicating operation of said scanning means to the position represented by said plurality of bits in said digital signals.

8. A visual cue display system as set forth in claim 7 in which said position selection means includes timer circuitry for providing horizontal and vertical synchronization pulses at a predetermined rate for said scanning means, and clock means for providing pulses to divide each horizontal line into a plurality of segments, each of which is identified by a different X coordinate, and said indicator means includes a binary counter connected to said clock means for translating said pulses into said word signals.

9. In a visual cue display system for displaying information relative to a moving object, display means including a display target having a plurality of positions, each of which is identified by a different X and Y coordinate, digital source means for providing digital signals representative of the X, Y coordinates of at least one position on the display at which the information is to be displayed, each of said digital signals comprising a word having a plurality of bits, point selection means connected to said display means for selectively energizing the different ones of the X, Y coordinates, indicator means connected to said position selection means including a first means for providing an indicator word signal comprised of a plurality of bits to represent the X coordinate of the energized one of the positions, and a second means for providing an indicator word signal comprised of a plurality of bits to represent the Y coordinate of the energized one of the positions, video generator means connected to said display means for providing a predetermined symbol on the display area, and symbol positioner means connected to said indicator means and said source means for operating said video generator means responsive to energization of the position represented by said digital signals including a first positioner circuit for detecting correspondence of the plurality of bits for the X coordinate provided by said first indicator means and the plurality of bits of said digital signal for the X coordinate, and a second positioner circuit for detecting correspondence of the plurality of bits for the Y coordinate provided by said second indicator means and the plurality of bits of the digital signal for the Y coordinate.

10. A visual cue display system as set forth in claim 9 in which at least one of said first and second positioner circuits includes a first circuit means for receiving the bit signals from said digital source which represent a word, storage means for storing each word represented by the incoming bits, and transfer means for transferring said bits from said first circuit means to said storage means responsive to complete storage of a word on said first circuit means.

11. In a visual cue display system for displaying information relative to a moving object, display means including a display target having a plurality of point positions, each of which is identified by a different X and Y coordinate, digital source means for providing digital signals representative of the X, Y coordinates of at least one point position on the display at which the information is to be displayed, each of which digital signals is comprised of a word having a plurality of bits, position selection means connected to said display means for energizing the different ones of said positions, indicator means connected to said position selection means for providing word signals indicating the energized one of the X, Y coordinates, each of which word signals is comprised of a plurality of bits, symbol positioner means connected to said indicator means and said digital source for providing at least one signal responsive to the receipt of a word signal having a plurality of bits indicating energization of the X coordinate represented by the bits of said digital signals, and video generator means connected to said symbol positioner means for providing a predetermined symbol on the display area comprising input means over which a plurality of pulses representing the successive X coordinates of a horizontal line are received from said indicator means, counter means connected to said input means operative only after receipt of said one signal from said symbol positioner means to advance in count responsive to each subsequent segment-representing pulse, preset gate means connected to said counter means including a pulse generator operative between predetermined counts of said counter means to generate a pulse of continuous duration for a preset plurality of said counts, and control means connected to said pulse generator for effecting selective coupling of said pulse output to said display means.

12. In a visual cue display system for displaying information relative to a moving object, display means including a display target having a plurality of positions, each of which is identified by a different X and Y coordinate, digital source means for providing digital signals representative of the X, Y coordinates of at least one position on the display at which the information is to be displayed, each of which signals comprises a word having a plurality of bits, position selection means connected to said display means for energizing the different ones of said positions, indicator means connected to said position selection means for providing word signals indicating the energized one of the X, Y coordinates, each of which word signals is comprised of a plurality of bits, symbol positioner means connected to said indicator means and said digital source means for providing at least one signal responsive to the receipt of a signal comprised of a plurality of bits indicating energization of the positions having the Y coordinate represented by the bits of said digital signals, and a video generator means connected to said symbol positioner means for providing a predetermined symbol on the display area comprising input means over which a plurality of pulses representing the energization of the successive lines of the target are received from said indicator means, counter means connected to said input means operative only after receipt of said one signal from said symbol positioner means to advance in count responsive to each subsequent line-representing pulse, preset gate means connected to said counter means including a pulse generator operative between predetermined counts of said counter means to generate a pulse of continuous duration for a preset plurality of said counts, and control means connected to said pulse generator for effecting selective coupling of said predetermined pulse output to said display means.

13. In a visual cue display system for displaying a line representing the elevation angle of an object, display means including a display target, generator means for controlling said display means in the provision of a raster on said display target having a plurality of lines, digital source means for providing digital signals representative of the elevation angle of said object, line identification means connected to said digital source means and said generator means operative to provide a different numerical signal for each of said lines as traced, video generator means for providing an elevation line on the display area, and symbol positioner means for effecting operation of said video generator means only responsive to the receipt of a signal from said line identification means of a preset numerical value which is preassigned to said symbol positioner means.

14. A display system as set forth in claim 13 in which said video generator means includes ground shading circuit means for providing signals of progressively different values to said display means for successive lines of the raster between said elevation line and the bottom marginal edge of the target.

15. A display system as set forth in claim 13 in which said symbol positioner means includes means for effecting the tracing of a plurality of elevation lines, each of said elevation lines being assigned a different numerical value to thereby represent a predetermined different angle of elevation of said object.

16. In a visual cue display system for displaying information relating to the different conditions of a moving object, display means including a display target, generator means for controlling the trace of a predetermined number of raster lines thereon, indicator means connected to said generator means for providing a signal for each line trace, digital source means for providing digital signals representative of the variable conditions to be displayed, digital signals of different value being provided for different conditions, line identification means connected to said indicator means for providing each line trace with an identification number including means connected to said digital source means for changing the identification number for said lines by a value related to the value of digital signals received from said source means, video generator means for providing signals to said display means which provide a predetermined symbol on said display target, and symbol positioner means operative to energize said video generator means responsive only to a signal from said line identification means having a numerical value which is preassigned thereto.

17. A system as set forth in claim 16 in which the numerical value assigned to said lines responsive to receipt of certain of said digital signals is larger than the number of lines displayed on said raster, and in which certain of said symbol positioner means are preassigned numbers of said larger value.

18. A visual cue display system as set forth in claim 16 in which said video generator means includes means for coupling signals to said display means which provide a series of spaced bars extending in a line across the display target.

19. In a visual cue display system for displaying information relative to a moving object, display means including a display target, generator means for controlling the trace of a predetermined number of raster lines thereon, counter means connected to said generator means for counting each line as traced, source means for providing digital signals which vary in value to represent different conditions, means connecting said digital signals to said counter means to vary the initial count on said counter means by the value of said signal received from said source means, video generator means for providing a predetermined symbol on the display target, and preset count means connected to said counter means for effecting operation of said video generator means only when the count of said counter means is at the predetermined value preset therein.

20. A visual cue display system as set forth in claim 19 which includes a plurality of video generator means, a plurality of preset count means, each of which is connected to said counter means to control a different one of said video generator means as its associated count appears on said counter means, the assigned count of at least certain of said preset count means being higher than the actual number of lines on said raster.

21. In a visual cue display system for displaying information relative to a moving object, display means including means for providing a raster comprised of a predetermined number of lines on a display target, counter means operative to advance one count responsive to each successive line trace of the raster, and means for presetting said counter means to start said count for a raster at different numerical values for different predetermined conditions of said object, video generator means for providing a predetermined symbol on the display target, and preset count means connected to said counter means for effecting operation of said video generator means only when said predetermined count occurs on said counter means during a raster trace.

22. In a visual cue display system for displaying information relative to a moving object, display means including means for providing a raster comprised of a predetermined number of lines on a display target, counter means operative to advance one count responsive to each successive line trace of the raster, and means for presetting said counter means to start the count for a raster at different values for different elevation angles of said object, video generator means for providing a horizon line and ground plane on the display target as said counter operates to a predetermined one of the counts on said counter means, preset count means connected to said counter means for effecting operation of said video generator means only when a predetermined count occurs on the counter means during a raster trace.

23. In a visual cue display system for displaying information relative to a moving object, display means including a display target, video generator means for providing a predetermined symbol comprising a shaded area on said display target including counter means, means for advancing said counter means at predetermined spaced intervals, converter means operative to provide voltage signals of progressively different values for each predetermined advancement of said counter, and means for coupling said different value voltage signals to said display means to vary the intensity on the display at correspondingly different positions and thereby provide said shaded area.

24. In a visual cue display system for displaying information relative to a moving object, display means including a display target, video generator means for providing a horizon line and an associated shaded area on said display target, including counter means, means for advancing said counter means at predetermined spaced intervals, converter means operative in each predetermined advancement of said counter means to provide different voltage signals of progressively different values, means for coupling said voltage signals to said display means to provide said horizon line and associated shaded area, and reset means for resetting said counter means at predetermined timed intervals.

25. In a visual cue display system for displaying information relative to a moving object, display means including a display target having a plurality of positions, each of which positions is identified by a different X and Y coordinate, path generator means for providing digital signals representative of the X, Y coordinates of the points for a variable width path having an apex on the display target, source means for providing digital signals representative of desired changes in the path position, and means controlled by said digital signals from said path generator means to energize the X, Y coordinates on said target for the path position and shape represented by said digital signals received from said source means.

26. A system as set forth in claim 25 in which said display means includes means for effecting a raster trace on said target comprised of a plurality of horizontal lines, and said path generator means includes means for providing digital signals representative of at least two X coordinates for the path in each horizontal line trace of the display target in which the path occurs, to thereby provide a path having a width defined by two marginal edges.

27. A system as set forth in claim 25 in which said display means includes means for effecting a raster trace on said target comprised of a plurality of horizontal lines, and said path generator means includes means for providing digital signals representative of at least two X coordinates for the path in each line during which the path occurs, and means for varying the value of the digital signals representating the X coordinates for each successive line in a trace to vary the width of the path.

28. In a visual cue display system for displaying information relative to a moving object, display means including a display target having a plurality of positions, each of which is identified by a different X and Y coordinate, path generator means including means for providing digital signals representative of the X coordinates of the points for the edges of a path on the display target, and a second means for providing digital signals representative of the X coordinates of the path center line, and means controlled by said signals to energize the X, Y coordinates on said target represented by said digital signals.

29. In a visual cue display system for displaying information relative to a moving object, display means including a display target having a plurality of positions, each of which is identified by a different X and Y coordinate, path generator means including means for providing output digital signals representative of the X coordinates of the points on the display target for a path having edges sloping toward a vertex source, means for providing signals to said path generator means indicating a changing condition of said object, means in said path generator means connected to said source means for adjusting the value of the digital output signals for the X coordinates to correspondingly adjust the position of the path vertex, and means controlled by said path generator means to energize the X, Y coordinates on said target represented by said digital output signals.

30. A system as set forth in claim 29 in which said path generator means includes means for simultaneously adjusting the slope of the path to the new vertex position.

31. In a visual cue display system for displaying information relative to a moving object, display means including a display target having a plurality of positions, each of which is identified by a different X and Y coordinate, path generator means for providing digital output signals representative of the X, Y coordinates of the points on the display target for a path having an outline defined by two lines, input means for providing digital signals to said path generator means indicating changes in a predetermined condition of said object, means in said path generator means for varying the value of the digital output signals for the X coordinates to correspondingly adjust the spacing between said path lines, and means controlled by said path generator means to energize the X, Y coordinates on said target represented by said digital output signals.

32. In a visual cue display system for displaying information relative to a moving object, display means including means for effecting a raster on a display target comprised of a plurality of raster lines, each line having a plurality of positions, each raster line being identified by a different Y coordinate, and each position on a line being identified by a different X coordinate, path generator means for providing digital signals representative of the X, Y coordinates of the points for a path on the display target, and means controlled by digital signals to energize the X, Y coordinates on said target represented by said digital signals.

33. A system as set forth in claim 32 which includes input means for coupling signals to said path generator means representative of changing operating conditions for said object, and in which said path generator means includes means for effecting a corresponding variation in the value of said digital signals provided for said path coordinates.

34. In a visual cue display system for displaying information relative to a moving object, display means including means for effecting a raster on a display target comprised of a plurality of raster lines each line having a plurality of positions, each raster line being identfied by a different Y coordinate, and each position on a line being identified by a different X coordinate, path generator means for providing digital signals representative of the X, Y coordinates of the points for a path on the display target including means for computing the value of the X coordinate for each line during the raster trace, means for providing digital signals representative of said X coordinates for each successive line trace, and means controlled by digital signals to energize the X coordinates on said target represented by said digital signals for each successive raster line.

35. In a visual cue display system for displaying information relative to the altitude of a moving object, display means including a display target having a plurality of positions, each of which is identified by a different X and Y coordinate, signal generator means for providing signals representative of the X, Y coordinates of the points for at least one marker on the display target which represents an assigned altitude of the object, and means controlled by said signals to effect the display of said marker on said target for reference purposes.

36. In a visual cue display system for displaying information relative to a moving object, display means including a display target having a plurality of positions, each of which is identified by a different X and Y coordinate, path generator means including a first means for providing the display of a path at predetermined X and Y coordinates on the target, and signal generator means for providing at least one marker with said path to indicate the assigned altitude of the object.

37. A system as set forth in claim 36 which includes source means for providing signals to said path generator means to effect lateral displacement of said path on said target, and means responsive to said signals for controlling said signal generator means to simultaneously effect corresponding lateral displacement of said marker.

38. In a visual cue display system for displaying information relative to a moving object, display means including a display target having a plurality of positions, each of which is identified by a different X and Y coordinate, path generator means including means for providing the display of a path on the display, source means for providing signals to said path generator means representative of the amount of deviation of the object from a preassigned altitude, path width adjustment means in said path generator means for varying the width of said path responsive to the deviation signals, and signal generator means for providing a pair of markers on said target to indicate the width of the path at the assigned altitude.

39. A visual cue display system as set forth in claim 38 in which said path width adjustment means includes means for reducing the width of the path responsive to deviation of the object above the assigned altitude, and for increasing the path width responsive to deviation of the object below the assigned altitude.

40. In a visual cue display system for displaying information relative to a moving object, display means including a display target having a plurality of positions, each of which is identified by a different X and Y coordinate, path generator means for providing digital signals representative of the X, Y coordinates of the points for a path on the display, source means for providing digital signals representative of the relative altitude of the object to the path generator means, and means for energizing the X, Y coordinates represented by said digital signals from said path generator means to effect the display of the path on said target having a width related to said relative altitude signals, and signal generator means for providing a pair of associated markers which indicate the proper width of the path at a given altitude.

41. In a visual cue display system for displaying information relative to a moving object, display means including a display target having a plurality of positions, each of which is identified by a different X and Y coordinate, path generator means including a first means for providing signals to said display means which provide a path on the display which includes a center line which extends in the direction of the path apex and a signal generator means for providing signals to said display means to provide at least one marker on said target which locates the position of the path center line with the object on an assigned heading.

42. A visual cue display system as set forth in claim 41 which includes means for adjusting said path laterally relative to said marker.

43. In a visual cue display system for displaying information relative to a moving object, display means including a display target having a plurality of positions, each of which is identified by a different X and Y coordinate, path generator means for providing digital signals representative of the X, Y coordinates of the points for a path on the display, source means for providing to said path generator means signals representative of the altitude of the object referred to said path, means in said path generator means responsive to said altitude representative signals for adjusting the digital signals for the X, Y coordinate for the path to different values, and means connected to said path generator means for energizing the X, Y coordinates on said target represented by said digital signals to effect the display of a path on said target which has a width related to altitude.

44. In a visual cue display system for displaying information relative to a moving object, display means including a display target having a plurality of positions, each of which is identified by a different X and Y coordinate, signal generator means for providing digital signals representative of the X, Y coordinates of the points for a path having an apex, input means for providing signals to said signal generator means representative of the relative heading of the object, means in said signal generator means for adjusting the signals for the X, Y coordinates for the path to different values for different heading error signals, and means responsive to said digital signals for energizing the X, Y coordinates represented by said digital signals to effect the display of a path on said target which has its apex laterally displaced on the target to represent the heading error.

45. In a visual cue display system for displaying information relative to a moving object, display means including a display target having a plurality of positions, each of which is identified by a different X and Y coordinate, path generator means for providing digital signals representative of the X, Y coordinates of the points for a path on the display, input means for providing lateral position signals to said path generator means representative of the lateral displacement of the object from a predetermined course, and means in said path generator means responsive to said lateral position signals to change the value of the output digital signals and thereby the position of the path on the display.

46. In a visual cue display system for displaying information relative to a moving object, display means including a display target having a plurality of positions, each of which is identified by a different X and Y coordinate, input means for providing digital signals representative of a heading error angle for the object, path shape and position means connected to said input means for providing digital signals representative of the X, Y coordinates of the points for a path on the display defined by a line $X_1 = (y) \tan \phi$ in which $y$=the line position on the target and $\phi$=heading error angle, and means for energizing the X, Y coordinates represented by said digital signals to effect the display of a path centerline on which said target which extends toward the apex of the path.

47. A visual display system as set forth in claim 46 which includes means for effecting coordinate transformation of the digital value of each of the coordinates for at least one of the X, Y sets of coordinates to different digital values to thereby correspondingly vary the positioning of such portion on the display.

48. In a visual cue display system for displaying information relative to a moving object, display means including a display target having a plurality of positions, each of which is identified by a different X and Y coordinate, source means for providing signals representative of a heading error angle for the object, a lateral position error and the pitch and relative altitude of the object, path generator means connected to said source means for providing digital signals representative of the X, Y coordinates of the points for a path on the display defined by $$X_2 = [(y+k) \tan \phi + n + c] + r\left(1 - \frac{y+k}{g-m}\right), X_3 =$$
$$(y+k) \tan \phi + n + c] - r\left(1 - \frac{y+k}{g-m}\right)$$

in which $X_2$ is the right hand marginal line, and $X_3$ is the left hand marginal line of the path, and $y$=the vertical coordinate, $\phi$=heading error angle, $k$= is a constant for the hinge point with coordinate transformation, $n$=offset (lateral position error), $c$=a constant coordinate transformation for $x$, $1/g-m$ represents the apex vertical position, and $r$ is a factor of altitude relative to the path; and means for energizing the X, Y coordinates represented by said digital signals to effect the display of a path on said target.

49. In a visual cue display system for displaying information relative to a moving object, display means including a display target having a plurality of positions, each of which is identified by a different X and Y coordinate, source means for providing signals representative of a heading error angle, and relative altitude and pitch, path generator means connected to said source means for providing digital signals representative of the X, Y coordinates of the points for a path on the display defined by $$X_2 = y \tan \phi + r\left(1 - \frac{y}{g}\right), X_3 = y \tan \phi - r\left(1 - \frac{y}{g}\right)$$

in which $X_2$ is the right hand marginal line and $X_3$ is the left hand marginal line, and $y$=the vertical coordinate, $\phi$=heading error angle, $r$=relative altitude, and $1/g$ is the apex vertical position; and means for energizing the X, Y coordinates represented by said digital signals to effect the display of a path on said target.

50. In a visual cue display system for displaying information relative to a moving object, display means including a display target having a plurality of positions, each of which is identified by a different X and Y coordinate, input means for providing signals representative of the heading error angle of the object and path generator means connected to said input means for providing digital signals representative of the X, Y coordinates of the points for a path on the display, including means for providing a signal representative of the "y" coordinate to be energized on the target, means for providing the product of $(\tan \phi)(y+k)$ where $\phi$ is the heading error angle and $k$ is a constant indicating the hinge point of the path, means for providing the algebraic sum of the said product and the X coordinate for the center of the path in the center of the target, and means controlled by the signals representing said sum to energize said coordinate on the target.

51. A display system as set forth in claim 50 in which said last means includes counter means for providing an advancing count for each X coordinate energized in a line, and means for adjusting the value of the start count of said counter in each line counting operation.

52. In a visual cue display system for displaying information relative to a moving object, display means including a display target having a plurality of positions, each of which is identified by a different X and Y coordinate, input means for providing digital signals representative of the heading error angle of the object, path generator means connected to said input means for providing digital signals representative of the X, Y coordinates of the points for a path on the display, including means for providing a signal representative of the Y coordinate to be energized on the target, means for providing the product of $(\tan \phi)(y+k)$, where $\phi$ is the lateral offset of the path and $k$ is a constant representing the path hinge point, means for providing signals representative of the algebraic sum of said product and the X coordinate for the center of the path as displayed in the center of the target, and means controlled by the signals representing said sum to energize said X coordinate on the target in the line represented by said Y coordinate.

53. A display system as set forth in claim 52 in which said path generator means includes means for adding a value to said sum representative of the relative altitude of the object, means for subtracting said value from said sum, and means operative to energize the X coordinates represented by the resultant totals in the line represented by said Y coordinate.

54. A display system as set forth in claim 52 in which said path generator means includes means for adding a value to said sum representative of the product of the relative altitude of the digit and the position of the apex of the path to be displayed, means for subtracting said value from said sum, and means operative to energize the X coordinates represented by the resultant totals in the line represented by said Y coordinate.

55. A display system as set forth in claim 52 in which said path generator means includes means for providing said product with a negative value responsive to lateral displacement of said object from the path in one direction and a positive value responsive to lateral displacement in the other direction.

References Cited
UNITED STATES PATENTS

| | | | |
|---|---|---|---|
| 2,920,312 | 1/1960 | Gordon et al. | 343—5 |
| 2,967,263 | 1/1961 | Steinhauser | 343—108 X |
| 3,081,557 | 3/1963 | Mailhot | 35—10.4 X |
| 3,098,929 | 7/1963 | Kirchner | 343—11 X |
| 3,182,308 | 5/1965 | Dutton et al. | 343—5 |

RODNEY D. BENNETT, *Primary Examiner.*

CHESTER L. JUSTUS, *Examiner.*

E. T. CHUNG, P. M. HINDERSTEIN, D. C. KAUFMAN, *Assistant Examiners.*